US012427655B2

(12) United States Patent
Nariai et al.

(10) Patent No.: US 12,427,655 B2
(45) Date of Patent: Sep. 30, 2025

(54) ROBOT CONTROLLER AND ROBOT SYSTEM

(71) Applicant: KAWASAKI JUKOGYO KABUSHIKI KAISHA, Kobe (JP)

(72) Inventors: Hitoshi Nariai, Kobe (JP); Akinori Tani, Kobe (JP); Daisuke Ihara, Kobe (JP); Kazushi Mineura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 210 days.

(21) Appl. No.: 18/012,716

(22) PCT Filed: Jun. 23, 2021

(86) PCT No.: PCT/JP2021/023798
§ 371 (c)(1),
(2) Date: Dec. 23, 2022

(87) PCT Pub. No.: WO2021/261524
PCT Pub. Date: Dec. 30, 2021

(65) Prior Publication Data
US 2023/0330842 A1 Oct. 19, 2023

(30) Foreign Application Priority Data
Jun. 26, 2020 (JP) ................................. 2020-110822

(51) Int. Cl.
*B25J 9/16* (2006.01)

(52) U.S. Cl.
CPC .................................... *B25J 9/161* (2013.01)

(58) Field of Classification Search
CPC . B25J 9/161; B25J 13/06; B25J 9/1679; B25J 5/02; B25J 9/1664; G05B 2219/40252
(Continued)

(56) References Cited

U.S. PATENT DOCUMENTS 5,602,761 A * 2/1997 Spoerre .................. G01H 1/003
7,142,990 B2 * 11/2006 Bouse ................ G05B 23/0229
(Continued)

FOREIGN PATENT DOCUMENTS

JP H03222692 A * 10/1991
JP H06-332513 A 12/1994
(Continued)

OTHER PUBLICATIONS

Machine Translation of Application JP 2003321102 A (Shuji et al.) (Year: 2003).*
(Continued)

*Primary Examiner* — Adam R Mott
*Assistant Examiner* — Ellis B. Ramirez
(74) *Attorney, Agent, or Firm* — Oliff PLC

(57) ABSTRACT

A robot controller that controls an operation of a robot includes circuitry and memory equipment. The memory equipment stores target data indicating a target installation state of a transferrer that supports and moves at least one of the robot or a target object handled by the robot. The circuitry outputs to a display an input image showing a measurement position of an installation state of the transferrer together with an image of the transferrer. The circuitry receives measurement data of the installation state. The circuitry compares the measurement data with the target data to determine the presence or absence of the abnormality of the installation state.

9 Claims, 13 Drawing Sheets

(58) Field of Classification Search
USPC ............. 700/245, 174; 356/490; 702/39, 56; 324/522
See application file for complete search history.

(56) References Cited

U.S. PATENT DOCUMENTS

| | | | | |
|---|---|---|---|---|
| 2014/0025192 | A1* | 1/2014 | Seya .................. | G05B 19/4061 |
| 2018/0333868 | A1 | 11/2018 | Tanaka | |
| 2019/0316989 | A1* | 10/2019 | Lee ........................ | G01M 13/04 |

FOREIGN PATENT DOCUMENTS

| | | | | |
|---|---|---|---|---|
| JP | H07-178690 | A | | 7/1995 |
| JP | 2003321102 | A | * | 11/2003 |
| JP | 2014-021648 | A | | 2/2014 |
| JP | 2015200554 | A | * | 11/2015 |
| JP | 2018-192585 | A | | 12/2018 |

OTHER PUBLICATIONS

Machine Translation of Application JP H07178690 A (K. Masami) (Year: 1995).*
Machine Translation of JP-2015200554-A;"Visual Inspection Method and Visual Inspection Support Device" (Year: 2015).*

* cited by examiner

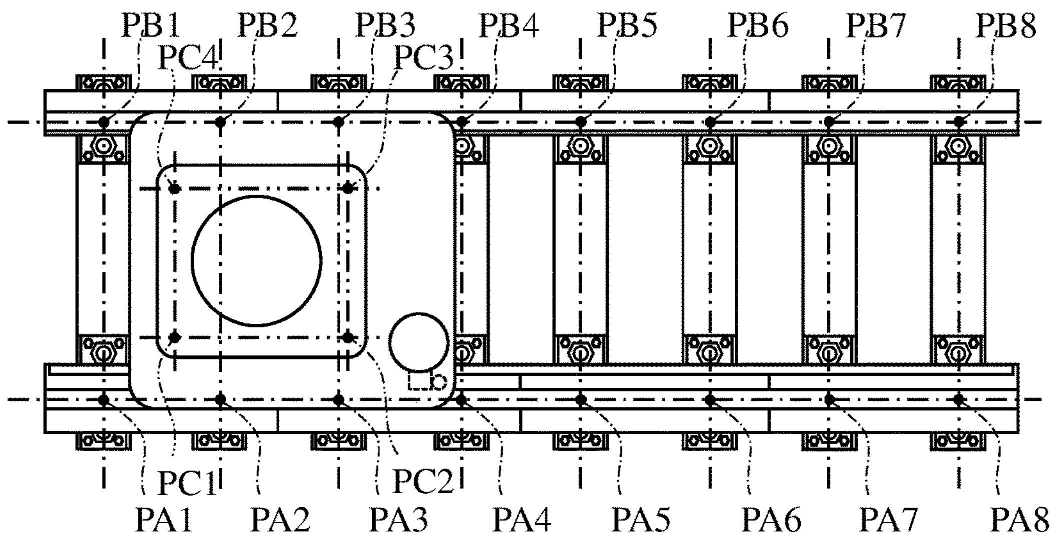

| DATE | 2020/4/1 | | | | | | | | | | |
|---|---|---|---|---|---|---|---|---|---|---|---|
| | LEVEL | | | | LEVEL | | | | LEVEL | | |
| | Heihgt | L-R Height Difference | L-R Angle Difference | | Heihgt | L-R Height Difference | L-R Angle Difference | | Heihgt | L-R Height Difference | L-R Angle Difference |
| PA1 | OK | **NG** | **NG** | PB1 | OK | **NG** | **NG** | PC1 | **NG** | **NG** | **NG** |
| PA2 | **NG** | OK | OK | PB2 | **NG** | OK | OK | PC2 | OK | OK | OK |
| PA3 | OK | OK | OK | PB3 | OK | OK | OK | PC3 | OK | OK | OK |
| PA4 | OK | OK | OK | PB4 | OK | OK | OK | PC4 | **NG** | **NG** | **NG** |
| PA5 | OK | OK | OK | PB5 | OK | OK | OK | CURRENT | | | |
| PA6 | OK | OK | OK | PB6 | OK | OK | OK | OK | | | |
| PA7 | OK | OK | OK | PB7 | OK | OK | OK | RESULT | | | |
| PA8 | OK | OK | OK | PB8 | OK | OK | OK | **NG** | | | |

FIG. 9

OSB

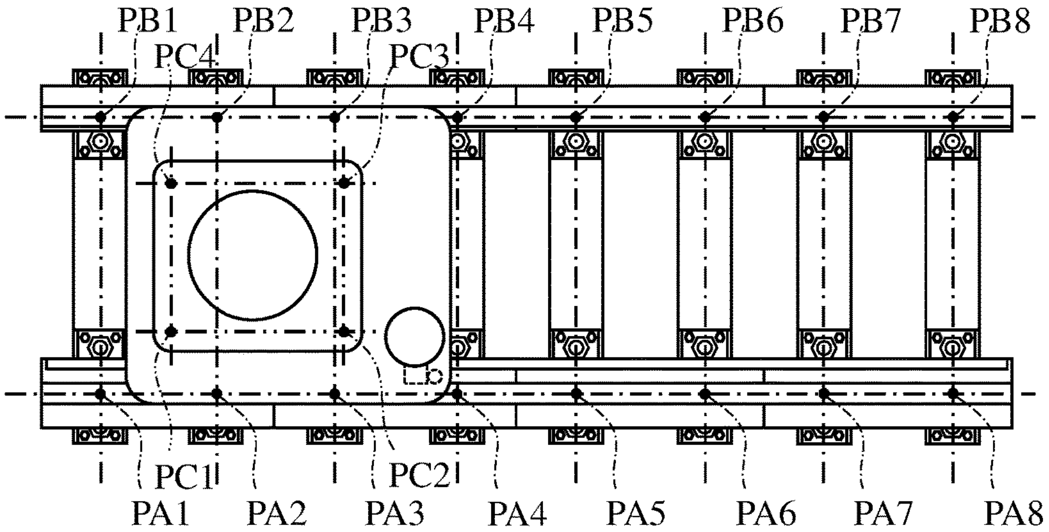

| DATE | | 2017/10/19 | 2018/4/10 | 2018/10/1 | 2019/4/1 | 2019/10/5 | 2020/4/1 |
|---|---|---|---|---|---|---|---|
| LEVEL | PA1 | OK | OK | OK | OK | OK | NG |
| | PA2 | OK | OK | OK | OK | OK | NG |
| | PA3 | OK | OK | OK | OK | OK | OK |
| | PA4 | OK | OK | OK | OK | OK | OK |
| | PA5 | OK | OK | OK | OK | OK | OK |
| | PA6 | OK | OK | OK | OK | OK | OK |
| | PA7 | OK | OK | OK | OK | OK | OK |
| | PA8 | OK | OK | OK | OK | OK | OK |
| | PB1 | OK | OK | OK | OK | OK | NG |
| | PB2 | OK | OK | OK | OK | OK | NG |
| | PB3 | OK | OK | OK | OK | OK | OK |
| | PB4 | OK | OK | OK | OK | OK | OK |
| | PB5 | OK | OK | OK | OK | OK | OK |
| | PB6 | OK | OK | OK | OK | OK | OK |
| | PB7 | OK | OK | OK | OK | OK | OK |
| | PB8 | OK | OK | OK | OK | OK | OK |
| | PC1 | OK | OK | OK | OK | OK | NG |
| | PC2 | OK | OK | OK | OK | OK | OK |
| | PC3 | OK | OK | OK | OK | OK | OK |
| | PC4 | OK | OK | OK | OK | OK | NG |
| CURRENT | | OK | OK | OK | OK | OK | OK |
| RESULT | | OK | OK | OK | OK | OK | NG |

FIG. 10

ROBOT CONTROLLER AND ROBOT SYSTEM

CROSS-REFERENCE TO RELATED APPLICATION

This application claims priority to and the benefit of Japanese Patent Application No. 2020-110822 filed on Jun. 26, 2020, the entire disclosure of which is incorporated herein by reference.

TECHNICAL FIELD

The present disclosure relates to a robot controller and a robot system.

BACKGROUND ART

Industrial robots have been installed and used at various places. For example, PTL 1 discloses a technique that detects installation failure, such as loosening of bolts that install and fix a transportable robot. A robot controller of PTL 1 prestores a speed feedback signal when the robot installed without the installation failure is operated based on a specific track pattern. The robot controller determines the presence or absence of the installation failure of the robot by comparing a speed feedback signal when the robot installed at a workplace is operated based on the specific track pattern with the prestored speed feedback signal.

CITATION LIST

Patent Literature

PTL 1: Japanese Laid-Open Patent Application Publication No. H06-332513

SUMMARY OF INVENTION

For example, transferring equipment, which is related to a robot and moves the robot or a target object handled by the robot, is installed on a supporting surface, such as a floor surface, in some cases. The robot controller of PTL 1 detects the installation failure based on the operation of the robot. Therefore, there is a possibility that the robot controller of PTL 1 cannot detect the installation failure of the transferring equipment with respect to the supporting surface. When there is the installation failure of the transferring equipment regarding the position, posture, and the like of the transferring equipment, durability of the transferring equipment may deteriorate.

An object of the present disclosure is to provide a robot controller and a robot system each of which detects installation failure of a transferrer related to a robot.

A robot controller according to one aspect of the present disclosure is a robot controller that controls an operation of a robot. The robot controller includes: circuitry; and memory equipment. The memory equipment stores target data indicating a target installation state of a transferrer that supports and moves at least one of the robot or a target object handled by the robot. The circuitry outputs to a display an input image that shows a measurement position of an installation state of the transferrer together with an image of the transferrer. The circuitry receives measurement data of the installation state. The circuitry compares the measurement data with the target data to determine the presence or absence of an abnormality of the installation state.

BRIEF DESCRIPTION OF DRAWINGS

FIG. 9 is a diagram showing one example of an output screen image of an installation state of the transferrer which is output by the robot controller according to the exemplary embodiment.

FIG. 10 is a diagram showing one example of an output screen image of a history of the installation state of the transferrer which is output by the robot controller according to the exemplary embodiment.

DESCRIPTION OF EMBODIMENTS

Hereinafter, an exemplary embodiment of the present disclosure will be described with reference to the drawings. The exemplary embodiment described below is a comprehensive or specific example. Among components in the following exemplary embodiment, components that are not recited in independent claims which embody the broadest concept of the present disclosure will be described as optional components. The diagrams in the accompanying drawings are schematic diagrams and are not necessarily strictly drawn. In the diagrams, the same reference signs are used for the substantially identical components, and the repetition of the same explanation may be avoided, or such explanation may be simplified. Moreover, in the present description and the claims, a "device" may denote not only a single device but also a system including devices.

Configuration of Robot System

Figure 1:
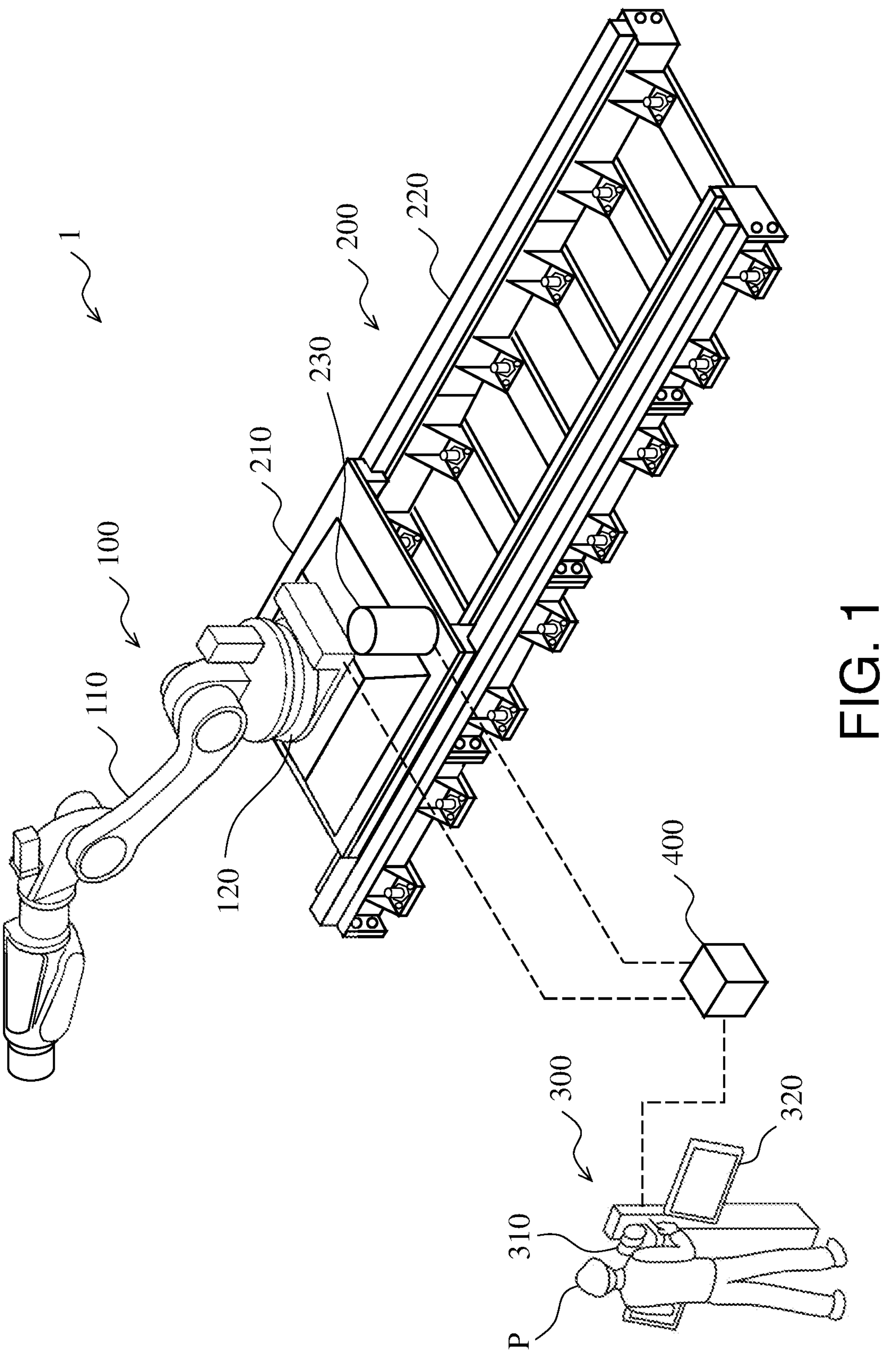
FIG. 1 is a perspective view showing one example of the configuration of a robot system according to an exemplary embodiment.

The configuration of a robot system 1 according to the exemplary embodiment will be described. FIG. 1 is a perspective view showing one example of the configuration of the robot system 1 according to the exemplary embodiment. As shown in FIG. 1, the robot system 1 includes a robot 100, a transferrer 200, a manipulation inputter 300, and a robot controller 400.

In the present exemplary embodiment, the robot 100 is, but not limited to, an industrial robot and includes a robotic arm 110 and a base 120. The base 120 supports the robotic arm 110. The robotic arm 110 includes at least one joint and has at least one degree of freedom. The robotic arm 110 is configured such that an end effector that can apply an action to a target object is attached to a tip of the robotic arm 110. The robotic arm 110 can freely change the position and posture of the end effector. In the present exemplary embodiment, the type of the robotic arm 110 is a vertical articulated type. However, the present exemplary embodiment is not limited to this. The type of the robotic arm 110 may be any type, and may be, for example, a horizontal articulated type, a polar coordinate type, a cylindrical coordinate type, a rectangular coordinate type, or the like.

In the present exemplary embodiment, the transferrer 200 can support and move the robot 100. Specifically, the transferrer 200 can linearly move the robot 100. However, the present exemplary embodiment is not limited to this. The transferrer 200 is installed on a horizontal supporting surface, such as a floor surface, and is fixed to the supporting surface. The position and direction of the supporting surface on which the transferrer 200 is installed may be any position and any direction. For example, the supporting surface may be an upper horizontal surface such as a ceiling or may be a standing surface such as a wall surface.

The transferrer 200 includes: a movable stage 210 that supports the robot 100 and is movable; a support base 220 that is fixed to the supporting surface and supports the movable stage 210 such that the movable stage 210 is movable; and a driver 230 that moves the movable stage 210. The base 120 of the robot 100 is fixed to the movable stage 210.

The manipulation inputter 300 includes an inputter 310 and a presenter 320. The inputter 310 receives input, such as various commands, information, and data, and outputs them to the robot controller 400. For example, the inputter 310 can receive input from a user P of the robot system 1. For example, the inputter 310 is connected to other equipment and can receive input from the equipment. For example, the inputter 310 may include known input means, such as a lever, a button, a touch panel, a joystick, a motion capture, a camera, or a microphone. For example, the inputter 310 may include terminal equipment, and examples of the terminal equipment include: a teaching pendant that is one of teaching equipment; smart devices, such as a smartphone and a tablet; a personal computer; and dedicated terminal equipment. For example, when the robot 100 is controlled in a master-slave mode, the inputter 310 may include a master device. For example, the master device may have a structure that allows the master device to perform the same or similar operation as or to the robotic arm 110.

The presenter 320 perceptibly presents commands, information, data, and the like, which are received from the robot controller 400 or the like, to the user P. For example, the presenter 320 may include a display, such as a liquid crystal display or an organic or inorganic EL display (Electro-Luminescence Display) and perform visual presentation. The presenter 320 may include a sound outputter, such as a speaker, and perform audible presentation. The presenter 320 may perform tactile presentation. The presenter 320 is one example of a display.

Configuration of Robot Controller

The robot controller 400 controls operations of the robot 100 and the transferrer 200. The robot controller 400 processes commands, information, data, and the like which are input through the inputter 310 of the manipulation inputter 300. The robot controller 400 may be connected to external equipment and may receive input, such as commands, information, and data, from the equipment and process them.

For example, the robot controller 400 controls the operations of the robot 100 and the transferrer 200 in accordance with the above commands, information, data, and the like. The robot controller 400 controls the supply of, for example, power to the robot 100 and the transferrer 200. The robot controller 400 manages, for example, information for managing the robot 100 and the transferrer 200.

The robot controller 400 outputs various commands, information, data, and the like to the manipulation inputter 300. For example, the robot controller 400 causes the presenter 320 to present various commands, information, data, and the like visually, audibly, or both visually and audibly. The robot controller 400 may output, for example, an image for manipulating the robot 100 and the transferrer 200, an image showing the states of the robot 100 and the transferrer 200, and an image for managing the robot 100 and the transferrer 200.

The robot controller 400 includes a computer. Moreover, the robot controller 400 may include: electric circuitry that controls electric power supplied to the robot 100 and the transferrer 200; equipment that controls power other than electric power, such as pneumatic pressure or liquid pressure, supplied to the robot 100 and the transferrer 200; equipment that controls a material, such as cooling water or paint, supplied to the robot 100 and the transferrer 200; and the like. The equipment other than the computer may be located separately from the robot controller 400.

For example, the computer includes processing circuitry or circuitry. The circuitry may include the processing circuitry. The processing circuitry or circuitry includes a processor, memory equipment, and the like. The processing circuitry or circuitry transmits or receives commands, information, data, and the like to or from other equipment. The processing circuitry or circuitry receives signals from various equipment and outputs control signals to control targets. The memory equipment of the processing circuitry or circuitry may include a memory, a storage, or both the memory and the storage. For example, the memory equipment may include at least one of various memory equipment, such as a semiconductor memory (a volatile memory, a non-volatile memory, etc.), a hard disk, and a SSD (Solid State Drive). For example, the memory equipment of the processing circuitry or circuitry stores programs executed by the processing circuitry or circuitry, various data, and the like.

The functions of processing circuitry or circuitry may be realized by a computer system including a processor such as a CPU (Central Processing Unit), a volatile memory such as a RAM (Random Access Memory), a non-volatile memory such as a ROM (Read-Only Memory), and the like. The computer system may realize the functions of the processing circuitry or circuitry in such a manner that the CPU uses the RAM as a work area and executes the programs stored in the ROM. Some or all of the functions of the processing circuitry or circuitry may be realized by the computer system, may be realized by dedicated hardware circuitry, such as electronic circuitry or integrated circuitry, or may be realized by the combination of the computer system and the hardware circuitry. The robot controller 400 may execute processing by centralized control performed by a single computer or may execute processing by distributed control performed by the cooperation of computers.

For example, the functions of the robot controller 400 may be realized by circuitry, such as a LSI (Large Scale Integration) or a system LSI. Each of the functions of the robot controller 400 may be realized by a single chip. Or, some or all of the functions of the robot controller 400 may be realized by a single chip Moreover, circuitry may be general-purpose circuitry or dedicated circuitry. As the LSI, a FPGA (Field Programmable Gate Array) that is programmable after the manufacture of the LSI, a reconfigurable processor that can reconfigure the connection and/or setting of circuit cells inside the LSI, an ASIC (Application Specific Integrated Circuit) that is a single circuit obtained by integrating function circuits for a specific application, or the like may be utilized.

The robot controller 400 is connected to the robot 100, the transferrer 200, and the manipulation inputter 300 through wired communication or wireless communication. The communication between these may be any wired communication or any wireless communication. In the present exemplary embodiment, since the robot controller 400 controls electric power supplied to the robot 100 and the transferrer 200, the robot controller 400 is connected to the robot 100 and the transferrer 200 through wired communication.

Figure 2:
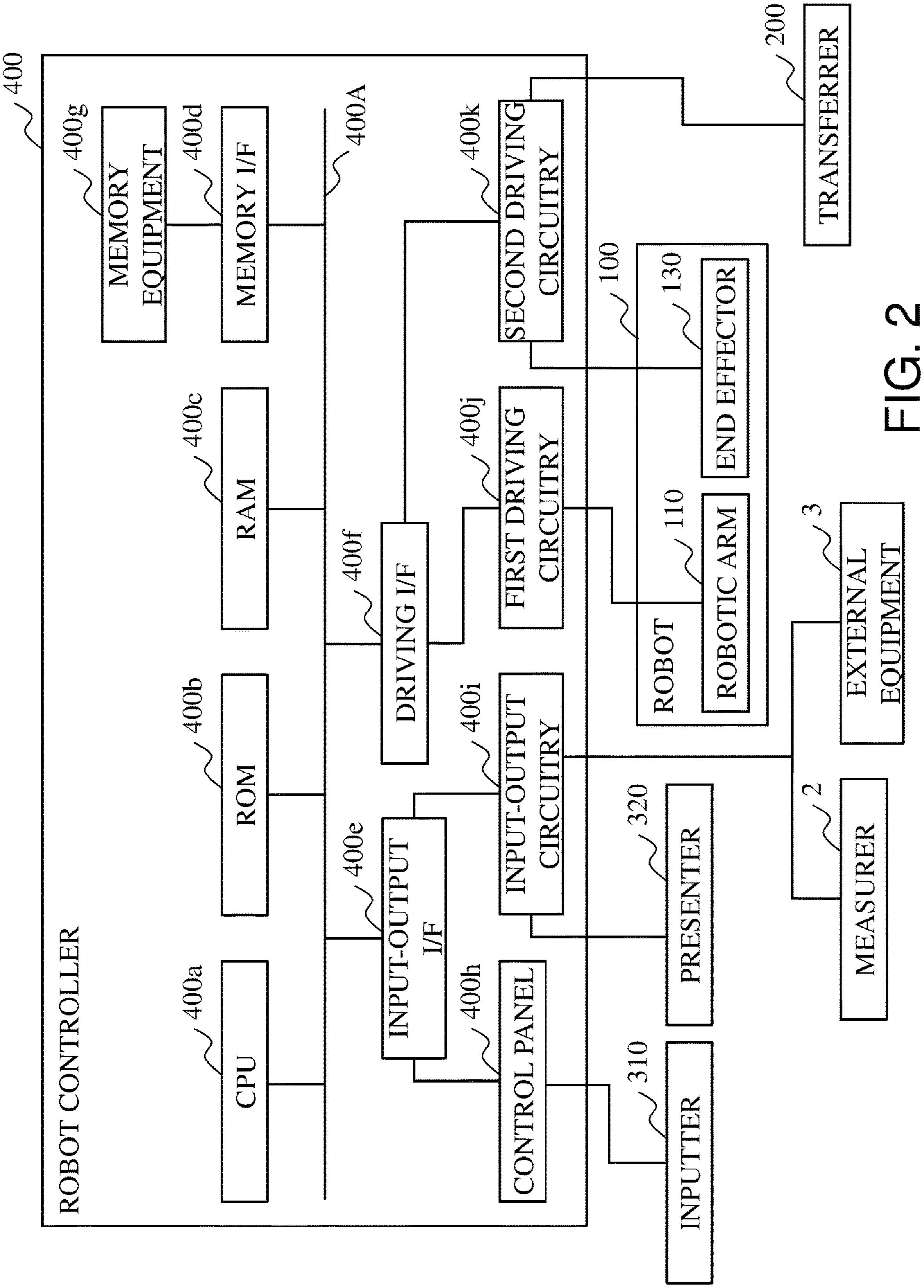
FIG. 2 is a block diagram showing one example of the configuration of a robot controller according to the exemplary embodiment.

One example of the configuration of the robot controller 400 will be described. FIG. 2 is a block diagram showing one example of the configuration of the robot controller 400 according to the exemplary embodiment. As shown in FIG. 2, the robot controller 400 includes a CPU 400*a*, a ROM 400*b*, a RAM 400*c*, a memory I/F (Interface) 400*d*, an input-output I/F 400*e*, and a driving I/F 400*f*. These are connected to each other by a bus 400A. The robot controller 400 further includes: memory equipment 400*g* connected to the memory I/F 400*d*; a control panel 400*h* connected to the input-output I/F 400*e*; input-output circuitry 400*i* connected to the input-output I/F 400*e*; and driving circuitry 400*j* and driving circuitry 400*k* which are connected to the driving I/F 400*f*. In the present exemplary embodiment, the robot controller 400 is realized by a combination of a computer system and hardware circuitry.

The memory I/F 400*d* controls reading of data from the memory equipment 400*g* or writing (storing) of data to (in) the memory equipment 400*g*. In the present exemplary embodiment, the memory equipment 400*g* is a storage. However, the present exemplary embodiment is not limited to this. The memory equipment 400*g* may be memory equipment incorporated in the robot controller 400 or may be memory equipment outside the robot controller 400. In the latter case, examples of the memory equipment 400*g* may include: storage mediums, such as a flash memory, a CD-ROM, a CD-R, and a DVD; and memory equipment, such as a hard disk and a SSD.

The input-output I/F 400*e* is an interface for communication of signals or the like with the control panel 400*h* and the input-output circuitry 400*i*. The control panel 400*h* is a control panel included in the robot controller 400. The control panel 400*h* is connected to the inputter 310 and transmits or receives signals to or from the inputter 310. For example, the control panel 400*h* may include, for example, a function of switching an operating mode of the robot 100. The input-output circuitry 400*i* is connected to various equipment outside the robot controller 400 and transmits or receives signals to or from the equipment. For example, the input-output circuitry 400*i* may be connected to a below-described measurer 2, external equipment 3, the presenter 320, various sensors, and the like.

The driving OF 400*f* is an interface for communication of signals or the like with the driving circuitry 400*j* and the driving circuitry 400*k*. The first driving circuitry 400*j* controls electric power supplied to drivers that drive joints of the robotic arm 110. For example, each driver includes a servomotor as an electric motor that generates driving power. The first driving circuitry 400*j* receives detection signals from a rotary sensor and an electric current sensor which are included in the servomotor, and transmits detected values, obtained by processing the detection signals, to the CPU 400*a* and the like as feedback information. The second driving circuitry 400*k* controls electric power supplied to an electric motor that drives an end effector 130 of the robot 100, a transferring motor 231 of the driver 230 of the transferrer 200, and the like. For example, the above motors are servomotors. The second driving circuitry 400*k* receives detection signals from a rotary sensor and an electric current sensor which are included in the servomotor, and transmits detected values, obtained by processing the detection signals, to the CPU 400*a* and the like as feedback information. In the servomotor, the electric current sensor is not essential. Each of the driving circuitry 400*j* and the driving circuitry 400*k* may acquire a detection result of an electric current of the servomotor from other means, such as circuitry that controls an electric current supplied to the servomotor.

Configuration of Transferrer

Figure 3:
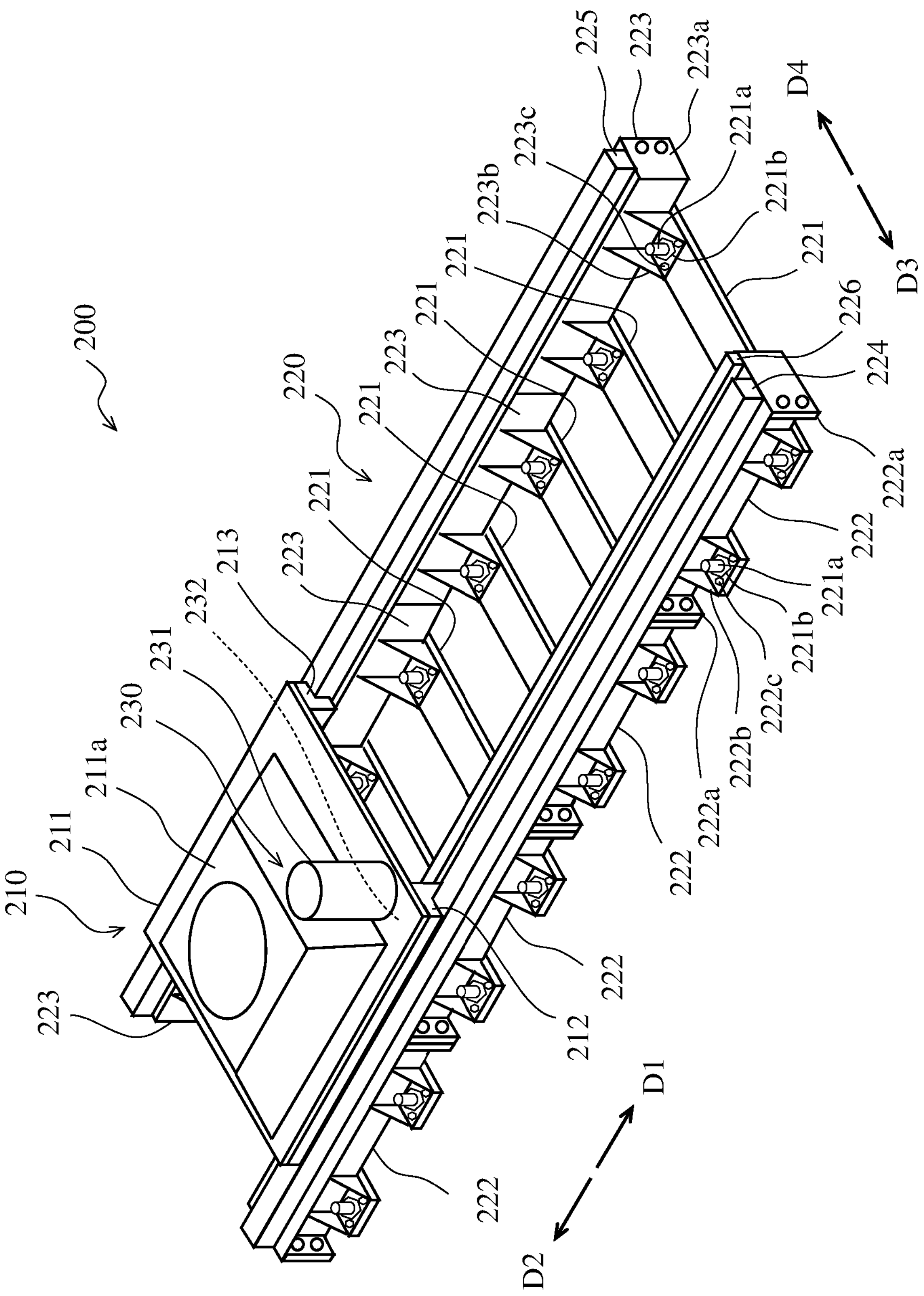
FIG. 3 is a perspective view showing one example of the configuration of a transferrer according to the exemplary embodiment.
Figure 4:
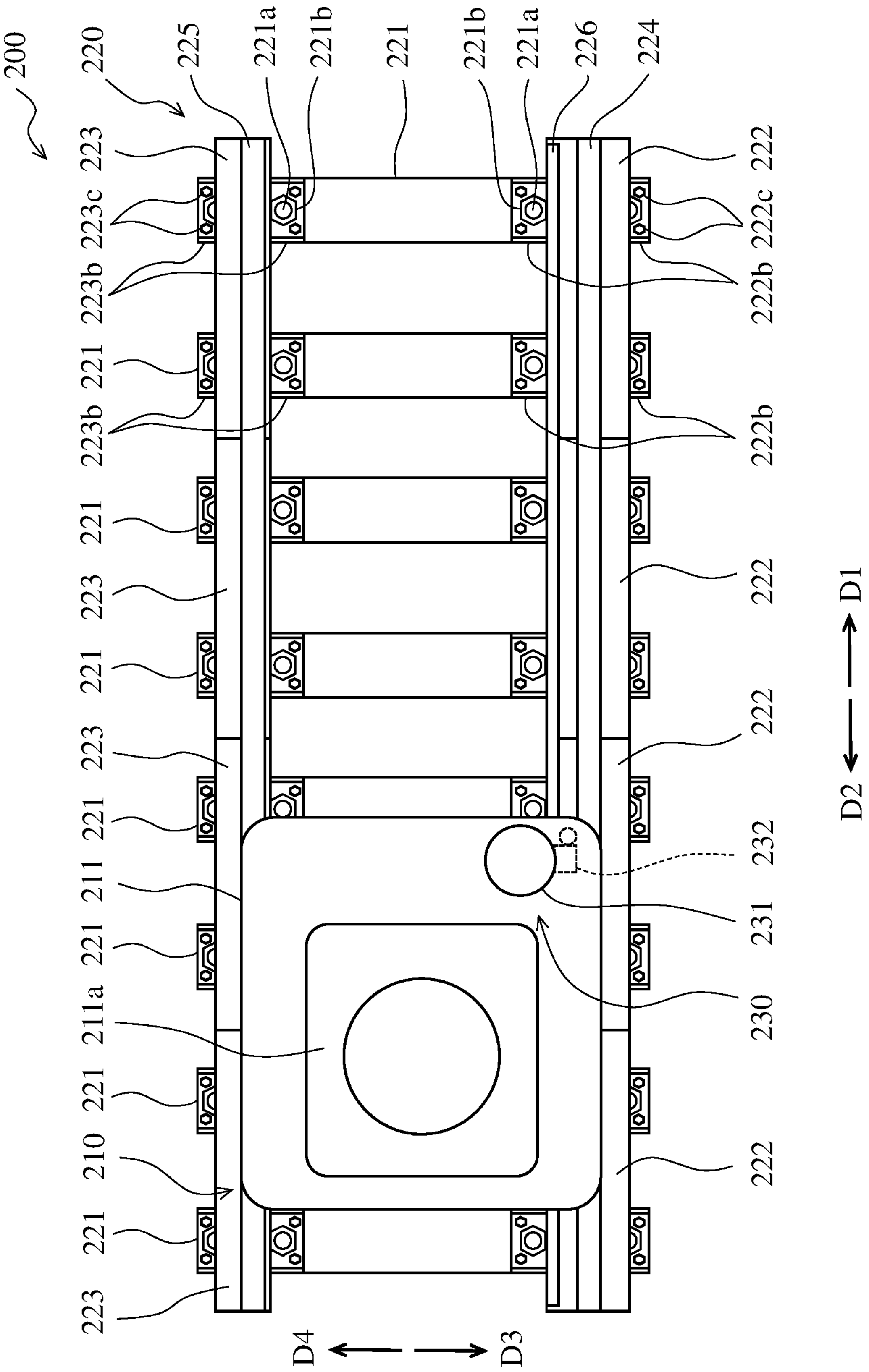
FIG. 4 is a plan view showing one example of the configuration of the transferrer according to the exemplary embodiment.
Figure 5:
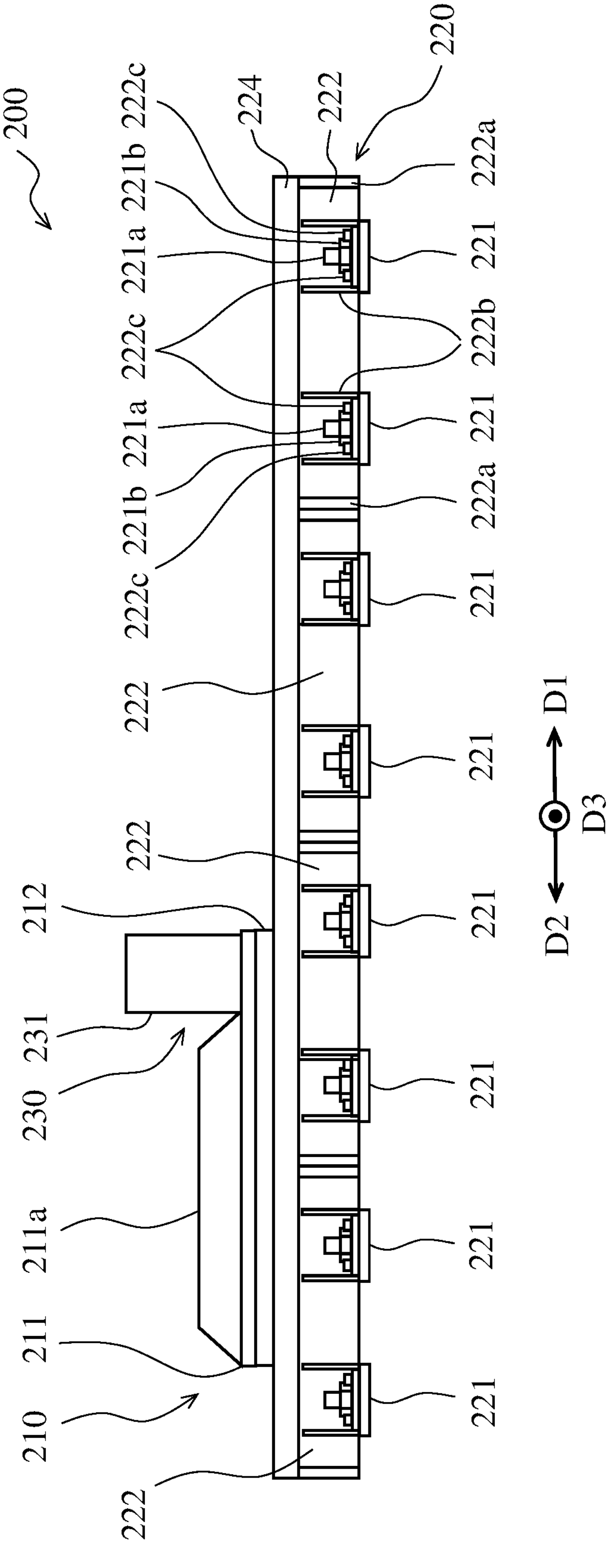
FIG. 5 is a side view showing one example of the configuration of the transferrer according to the exemplary embodiment.

The configuration of the transferrer 200 will be described. FIG. 3 is a perspective view showing one example of the configuration of the transferrer 200 according to the exemplary embodiment. FIG. 4 is a plan view showing one example of the configuration of the transferrer 200 according to the exemplary embodiment. FIG. 5 is a side view showing one example of the configuration of the transferrer 200 according to the exemplary embodiment. As shown in FIGS. 3 to 5, the support base 220 of the transferrer 200 supports the movable stage 210 such that the movable stage 210 moves in directions D1 and D2. The directions D1 and D2 are directions along the supporting surface on which the support base 220 is located. Moreover, the directions D1 and D2 are directions opposite to each other. The support base 220 includes base members 221, support members 222 and 223, guide members 224 and 225, and an auxiliary member 226.

Each of the base member 221 is located on and fixed to the supporting surface on which the support base 220 is located. Each of the base member 221 extends in a direction D3 that extends along the supporting surface and is orthogonal to the direction D1. The direction D3 and a direction D4 are directions opposite to each other. The base members 221 are spaced from each other in the direction D1 and are located in parallel with each other. Both ends of each of the base member 221 are fixed to jack bolts 221*a* embedded in the supporting surface. The height of each of the base member 221 in a vertical direction relative to the supporting surface can be adjusted by rotating nuts 221*b* of the jack bolts 221*a*.

In the present description and the claims, the term "parallel" may include both "completely parallel" and "substantially parallel". Moreover, the term "perpendicular" or "orthogonal" may include both "completely perpendicular or orthogonal" and "substantially perpendicular or orthogonal".

Each of the support members 222 and 223 is located on and across the base members 221 and is fixed to the base members 221. Each of the support members 222 and 223 has a columnar shape. Each of the support members 222 includes flange-shaped connecting portions 222*a* at both longitudinal direction ends thereof, and each of the support members 223 includes flange-shaped connecting portions 223*a* at both longitudinal direction ends thereof. The support member 222 includes at least one connecting portion 222*b* at each of both sides thereof which face a direction intersecting with a longitudinal direction thereof. The support member 223 includes at least one connecting portion 223*b* at each of both sides thereof which face a direction intersecting with a longitudinal direction thereof.

In the present exemplary embodiment, four first support members 222 are lined up in one row such that the longitudinal directions of the four first support members 222 extend along the direction D1. The adjacent first connecting portions 222*a* are coupled to each other by bolts and nuts. Moreover, four second support members 223 are lined up in one row such that the longitudinal directions of the four second support members 223 extend along the direction D1. The adjacent first connecting portions 223*a* are coupled to each other by bolts and nuts. The four first support members 222 are located in the vicinity of ends of the base members 221 in the direction D3, and the four second support members 223 are located in the vicinity of ends of the base members 221 in the direction D4. The four first support members 222 are parallel to the four second support members 223. Each of the second connecting portions 222*b* is fixed to the corresponding base member 221 by a bolt 222*c*, and each of the second connecting portions 223*b* is fixed to the corresponding base member 221 by a bolt 223*c*. The heights of the four first support members 222 in the vertical direction and the heights of the four second support members 223 in the vertical direction may be adjusted by adjusting the heights of the base members 221 in the vertical direction.

The first guide member 224 is located on and fixed to the four first support members 222 and extends in the direction D1 over the four first support members 222. The second guide member 225 is located on and fixed to the four second support members 223, is in parallel with the first guide member 224, and extends in the direction D1 over the four second support members 223. Each of the guide members 224 and 225 has a rectangular column shape. Each of the guide members 224 and 225 forms a smooth guide surface extending in the direction D1.

The auxiliary member 226 is located on and fixed to the four first support members 222, is in parallel with the first guide member 224, and extends in the direction D1 over the four first support members 222. The auxiliary member 226 is located away from the first guide member 224 in the direction D4. For example, the auxiliary member 226 is engaged with a driving element of the driver 230 located between the auxiliary member 226 and the first guide member 224.

The movable stage 210 includes a main body 211 and sliding members 212 and 213 supporting the main body 211. The main body 211 extends across the guide members 224 and 225 in the directions D3 and D4. The main body 211 includes an attaching portion 211*a* projecting upward. The attaching portion 211*a* is configured such that the base 120 of the robot 100 is attachable to the attaching portion 211*a*.

Each of the sliding members 212 and 213 has a columnar shape extending in the direction D1 and is fixed to the main body 211. The first sliding member 212 is engaged with an upper surface of the first guide member 224 and a side surface of the first guide member 224 which faces the direction D4. The second sliding member 213 is engaged with an upper surface of the second guide member 225 and a side surface of the second guide member 225 which faces the direction D3. The sliding member 212 on the guide member 224 and the sliding member 213 on the guide member 225 restrict the movement of the main body 211 in the directions D3 and D4 and support the main body 211 from below such that the main body 211 is slidable in the directions D1 and D2.

The driver 230 is located at the main body 211. The driver 230 includes the transferring motor 231 and a drive structure 232. In the present exemplary embodiment, the transferring motor 231 is a servomotor. The drive structure 232 converts rotational driving power of the transferring motor 231 into driving power that moves the main body 211 relative to the support base 220 in the directions D1 and D2. The drive structure 232 includes a driving element that is rotated by the transferring motor 231. An outer peripheral surface of the driving element is engaged with the auxiliary member 226. The driving element rotates to move relative to the auxiliary member 226 in the directions D1 and D2. For example, the drive structure 232 may include: a rack-and-pinion structure including a driving element as a pinion and a rack located at the auxiliary member 226; a ball screw structure including a driving element as a nut and a screw shaft located at the auxiliary member 226; or the like.

The above transferrer 200 is track-type transferring equipment including the guide members 224 and 225 as a track used to move the movable stage 210. However, the transferrer 200 is not limited to the track-type transferrer and may be any transferrer that can move the robot 100 and is installed on the supporting surface or the like.

The operation and load of the robot 100 on the transferrer 200 may be influences by an installation state of the transferrer 200. The load on the transferrer 200 when the transferrer 200 moves the robot 100 may be influenced by the installation state of the transferrer 200. When the robot 100 and the transferrer 200 are continuously used in a state where the installation state of the transferrer 200 is abnormal, durability of the robot 100 and the transferrer 200 may deteriorate. Therefore, the installation state of the transferrer 200 is managed.

For example, when installing the transferrer 200, position management of the transferrer 200, posture management of the transferrer 200, or position-posture management including both the position management and posture management of the transferrer 200 is performed. In the present exemplary embodiment, as one example of the position-posture management, level management including height management of the transferrer 200 and inclination management of the transferrer 200 is performed. In the present exemplary embodiment, the level management of the upper surfaces of the guide members 224 and 225 and the level management of the upper surface of the main body 211 of the movable stage 210 are performed. However, the present exemplary embodiment is not limited to this. A target of the position management and the posture management may be determined in accordance with the configuration of the transferrer 200.

Figure 6:
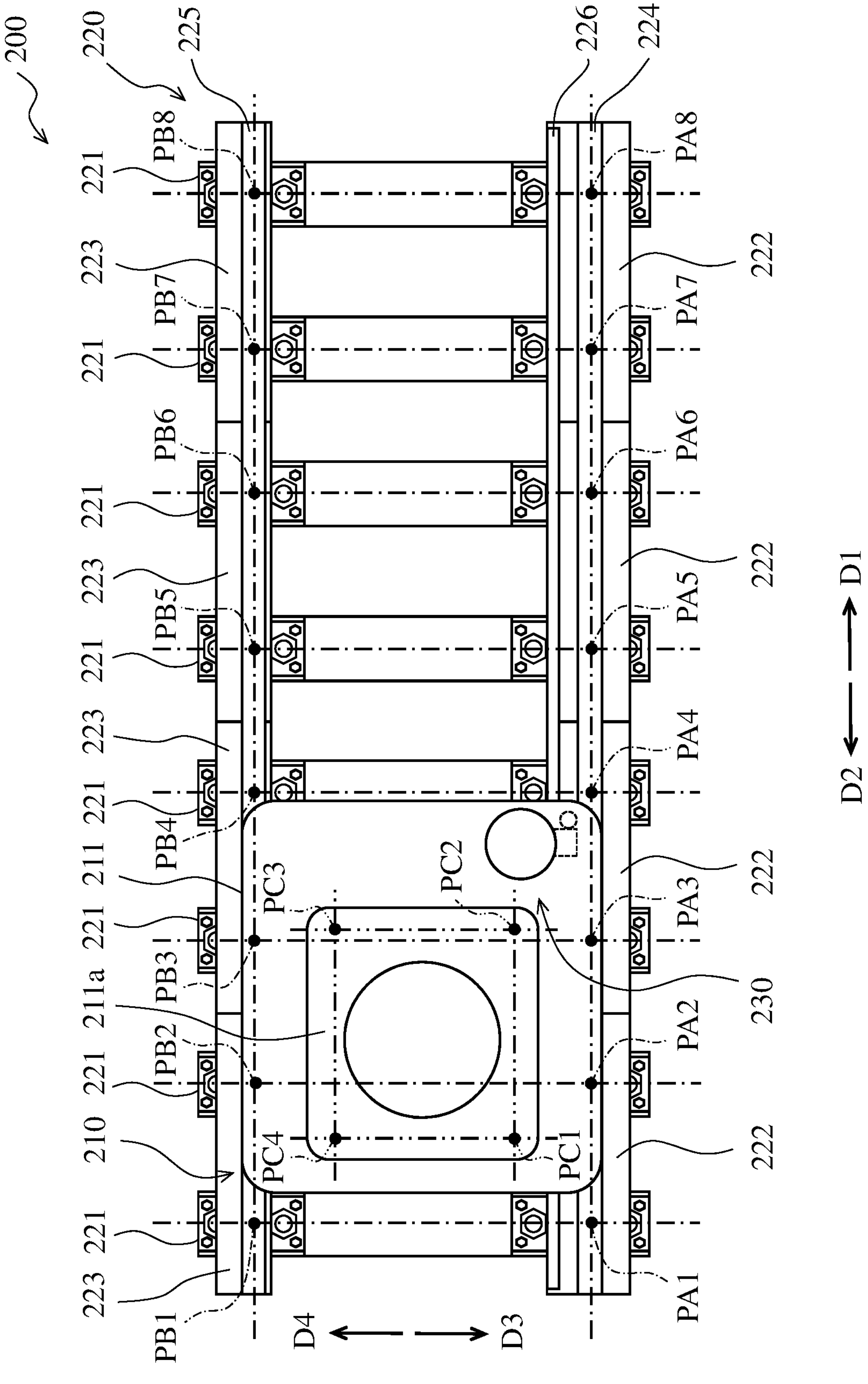
FIG. 6 is a plan view showing one example of management positions of the transferrer according to the exemplary embodiment.

For example, as shown in FIG. 6, the position-posture management of the upper surfaces of the guide members 224 and 225 is performed at positions which are located on the upper surfaces of the guide members 224 and 225 and correspond to the base members 221. FIG. 6 is a plan view showing one example of management positions of the transferrer 200 according to the exemplary embodiment. For example, each of the positions which correspond to the base members 221 may be a position at which in a plan view, i.e., when viewed from an upper side to a lower side, a center line (one-dot chain line) of the guide member 224 or 225 and a center line (one-dot chain line) of each base member 221 intersect with each other. Such position is a position at which the guide member 224 or 225 is supported by the base member 221. In the example shown in FIG. 6, eight points PA1 to PA8 on the upper surface of the first guide member 224 and eight points PB1 to PB8 on the upper surface of the second guide member 225 are points of the position-posture management.

The position-posture management of the main body 211 is performed at a position of a corner portion of the upper surface of the attaching portion 211*a* of the main body 211. The upper surface of the attaching portion 211*a* is a surface on which the base 120 of the robot 100 is located. For example, the position-posture management may be performed at positions of four corners of the upper surface of the attaching portion 211*a*. In the example of FIG. 6, four points PC1 to PC4, which are located at the four corners on the upper surface of the attaching portion 211*a*, are the points of the position-posture management.

For example, in the height management, target values and/or target ranges of height measurement values by leveling are preset for the points PA1 to PA8, the points PB1 to PB8, and the points PC1 to PC4. Hereinafter, the wording "the target value and/or the target range" denotes the target value, the target range, or both the target value and the target range. The transferrer 200 is installed such that each of the height measurement values of the points PA1 to PA8, the points PB1 to PB8, and the points PC1 to PC4 satisfies the target value and/or the target range.

For example, in the inclination management, for each pair of two adjacent points among the points PA1 to PA8, the points PB1 to PB8, and the points PC1 to PC4, the target value and/or the target range of an inclination amount based on a difference between the height measurement values of the two points are preset. The transferrer 200 is installed such that the inclination amount of each pair of two points among the points PA1 to PA8, the points PB1 to PB8, and the points PC1 and PC4 satisfies the target value and/or the target range. The examples of the above pair may include: a pair of two points adjacent to each other in the direction D1 or D2, a pair of two points adjacent to each other in the direction D3 or D4, a pair of two points adjacent to each other in a direction that diagonally intersects with the direction D1, D2, D3, or D4, and the like.

Functional Configuration of Robot Controller

Figure 7:
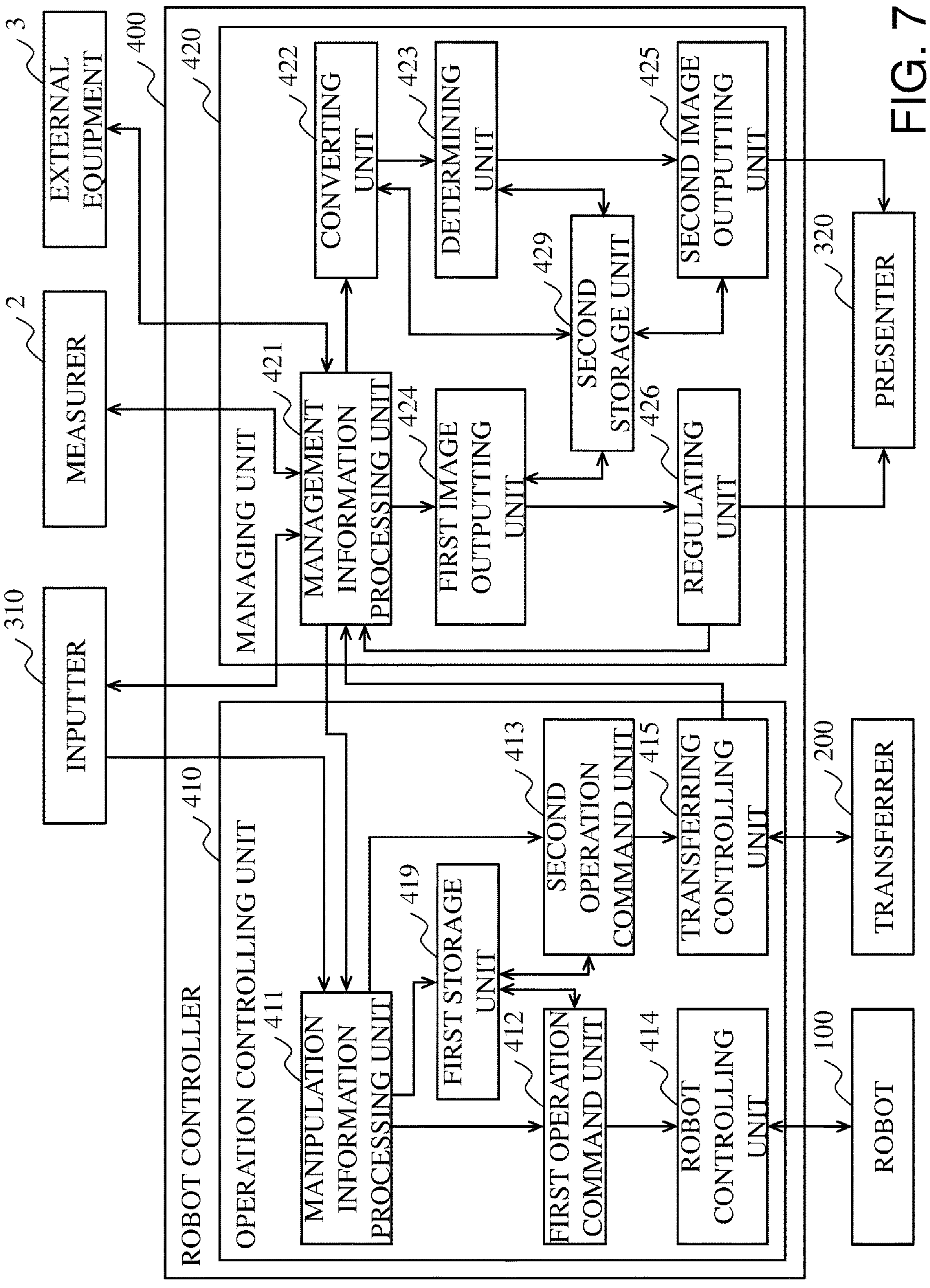
FIG. 7 is a block diagram showing one example of the functional configuration of the robot controller according to the exemplary embodiment.

The functional configuration of the robot controller 400 will be described. FIG. 7 is a block diagram showing one example of the functional configuration of the robot controller 400 according to the exemplary embodiment. As shown in FIG. 7, the robot controller 400 includes an operation controlling unit 410 and a managing unit 420 as functional components. Moreover, the operation controlling unit 410 includes a manipulation information processing unit 411, a first operation command unit 412, a second operation command unit 413, a robot controlling unit 414, a transferring controlling unit 415, and a first storage unit 419 as functional components. The managing unit 420 includes a management information processing unit 421, a converting unit 422, a determining unit 423, a first image outputting unit 424, a second image outputting unit 425, a regulating unit 426, and a second storage unit 429 as functional components.

The functions of the storage units 419 and 429 are realized by the memory equipment of the robot controller 400. For example, each of the functions of the storage units 419 and 429 is realized by the ROM 400*b* of FIG. 2, the memory equipment 400*g* of FIG. 2, both the ROM 400*b* and the memory equipment 400*g*, or the like. The functions of the functional components of the operation controlling unit 410 and the managing unit 420 other than the storage units 419 and 429 are realized by a processor of the robot controller 400 and the like, and for example, are realized by the CPU 400*a* of FIG. 2, and the like. The memory equipment of the computer of the robot controller 400 and the memory equipment 400*g* are examples of the memory equipment of the robot controller. A part of the memory equipment of the robot controller or the entire memory equipment of the robot controller may be included in the processing circuitry or circuitry of the robot controller or may not be included in the processing circuitry or circuitry of the robot controller.

The first storage unit 419 stores various information, and the stored information can be read from the first storage unit 419. For example, the first storage unit 419 may store programs, various data, and the like. For example, the first storage unit 419 may store programs, data, information, and the like which are used to operate the robot 100 and the transferrer 200. For example, the first storage unit 419 may store teaching data used in order that the robot 100 automatically and autonomously operates.

In a manipulation mode out of the manipulation mode and a management mode, the manipulation information processing unit 411 processes information input to the robot controller 400. The manipulation mode is a control mode of the robot controller 400 which performs control that operates the robot 100 and the transferrer 200. The management mode is a control mode of the robot controller 400 which performs control that manages the installation state of the transferrer 200. The manipulation information processing unit 411 causes the operation controlling unit 410 to operate in the manipulation mode in accordance with an execution command of the manipulation mode which is received from the inputter 310 of the manipulation inputter 300.

The manipulation information processing unit 411 processes commands, information, data, and the like which are received from the inputter 310, and outputs them to the corresponding components. For example, the manipulation information processing unit 411 outputs commands, information, data, and the like, which are related to the operation of the robot 100, to the first operation command unit 412, outputs commands, information, data, and the like, which are related to the operation of the transferrer 200, to the second operation command unit 413, and stores information, data, and the like of the robot 100 and the transferrer 200 in the first storage unit 419.

Based on the commands, information, data, and the like which are related to the operation of the robot 100, the first operation command unit 412 generates an operation command that operates the robot 100, specifically the robotic arm 110, the end effector 130, and the like. Then, the first operation command unit 412 outputs the generated operation command to the robot controlling unit 414. For example, the robot 100 can operate in each of an autonomous operation mode, a manual operation mode, and a corrected autonomous operation mode.

In the autonomous operation mode, the robot 100 automatically and autonomously executes a predetermined operation. The first operation command unit 412 generates an autonomous operation command by using predetermined operation information stored in the first storage unit 419, the autonomous operation command being an operation command that autonomously operates the robot 100 in accordance with the program. The predetermined operation information may be information including the positions, postures, and states of respective portions of the robot 100, the execution sequences of the positions, postures, and states of the respective portions, and the like. For example, the predetermined operation information may be preset data, teaching data, or the like.

In the manual operation mode, the robot 100 operates in accordance with manipulation which is input to the inputter 310 by the user P. The first operation command unit 412 generates a manual operation command which is an operation command that causes the robotic arm 110, the end effector 130, and the like to execute an operation corresponding to a manipulation command received from the inputter 310. The manipulation command is a command corresponding to a manipulating operation which is input to the inputter 310 in order to manually manipulate the robot 100.

In the corrected autonomous mode, the robot 100 automatically and autonomously executes a predetermined operation. During the execution of this operation, the robot 100 receives the input of the manipulating operation from the user P through the inputter 310. Then, the robot executes the operation corresponding to the manipulating operation instead of the autonomous operation that is being executed. As with the autonomous operation mode, the first operation command unit 412 generates the autonomous operation command and outputs it to the robot controlling unit 414. When the first operation command unit 412 receives the manipulation command from the inputter 310 during the operation of the robot 100, the first operation command unit 412 generates the manual operation command corresponding to the manipulation command and outputs the manual operation command instead of the autonomous operation command to the robot controlling unit 414.

The robot controlling unit 414 executes control that drives drivers of the respective portions of the robot 100 in accordance with the operation command received from the first operation command unit 412. For example, the robot controlling unit 414 determines values of electric currents supplied to the servomotors of the drivers of the joints of the robotic arm 110 and controls the supply of the electric currents. The robot controlling unit 414 determines values of the electric current supplied to a servomotor of a drivers of the end effector 130 and controls the supply of the electric current. When controlling the servomotor, the robot controlling unit 414 may use the rotation amount and electric current value of the servomotor as feedback information. Some of the functions of the robot controlling unit 414 may be realized by the driving circuitry 400*j* and the driving circuitry 400*k*.

Based on the commands, information, data, and the like which are related to the operation of the transferrer 200, the second operation command unit 413 generates an operation command that operates the transferrer 200, specifically the transferring motor 231. Then, the second operation command unit 413 outputs the generated operation command to the transferring controlling unit 415. For example, as with the robot 100, the second operation command unit 413 may generate an operation command of the transferrer 200 which corresponds to the autonomous operation mode, the manual operation mode, or the corrected autonomous operation mode.

The transferring controlling unit 415 executes control that drives the transferring motor 231 in accordance with the operation command received from the second operation command unit 413. For example, the transferring controlling unit 415 determines the value of the electric current supplied to the transferring motor 231 and controls the supply of the electric current. The transferring controlling unit 415 may use the rotation amount and electric current value of the transferring motor 231 as feedback information. Some of the functions of the transferring controlling unit 415 may be realized by the second driving circuitry 400*k*.

The second storage unit 429 stores various information, and the stored information can be read from the second storage unit 429. For example, the second storage unit 429 stores information, data, and the like which are related to the installation state of the transferrer 200. For example, the second storage unit 429 may store information of positions of measurement points on the transferrer 200 which are used to detect the installation state of the transferrer 200. The second storage unit 429 stores data of an image which is presented on the presenter 320 or the like in order to input information, data, and the like which are related to the installation state of the transferrer 200. The second storage unit 429 stores data of an image which is presented on the presenter 320 or the like in order to output the installation state of the transferrer 200.

For example, the data related to the installation state of the transferrer 200 includes: position-posture data of the transferrer 200; electric current data of the transferrer 200; or both the position-posture data and electric current data of the transferrer 200. In the present exemplary embodiment, the data related to the installation state of the transferrer 200 includes both the position-posture data and electric current data of the transferrer 200. The position-posture data includes the position of the transferrer 200, the posture of the transferrer 200, or both the position and posture of the transferrer 200. In the present exemplary embodiment, the position-posture data includes both the position and posture of the transferrer 200. Moreover, in the present exemplary embodiment, the position of the transferrer 200 includes the height of the transferrer 200, and the posture of the transferrer 200 includes the inclination of the transferrer 200.

The height of the transferrer 200 may include, for example, the heights of the upper surfaces of the guide members 224 and 225 of the support base 220 and the height of the upper surface of the main body 211 of the movable stage 210. For example, the above height may be the height at each of the points PA1 to PA8, the points PB1 to PB8, and the points PC1 and PC4 shown in FIG. 6. The inclination of the transferrer 200 may include, for example, the inclination of the upper surface of the guide member 224 itself, the inclination of the upper surface of the guide member 225 itself, the inclination from the upper surface of the guide member 224 toward the upper surface of the guide member 225, and the inclination of the main body 211. For example, the above inclination may be an inclination amount based on a difference between the heights of two adjacent points among the points PA1 to PA8, the points PB1 to PB8, and the points PC1 and PC4 shown in FIG. 6.

The electric current data includes the electric current value of the transferring motor 231 of the transferrer 200. Moreover, the electric current data may include the rotation amount of the transferring motor 231 when the transferring motor 231 is in the states of various electric current values.

To be specific, the electric current data may include data in which the electric current value of the transferring motor 231 and the rotation amount of the transferring motor 231 which corresponds to this electric current value are associated with each other. The position of movable stage 210 on the transferrer 200 can be detected by using the rotation amount of the transferring motor 231. With this, the electric current value of the transferring motor 231 and the position of the movable stage 210 which corresponds to this electric current value can be associated with each other.

For example, the second storage unit 429 stores: measurement data and target data of the position-posture data; measurement data and target data of the electric current data; or both the measurement data and target data of the position-posture data and the measurement data and target data of the electric current data. The measurement data of the position-posture data is a measurement result of the position-posture data, and the measurement data of the electric current data is a measurement result of the electric current data. The measurement data is data acquired by the robot controller 400. Hereinafter, the measurement data of the position-posture data is also called "position-posture measurement data", and the measurement data of the electric current data is also called "electric current measurement data". The second storage unit 429 may store the measurement data of the position-posture data in a time-series manner as history data in which the measurement data of the position-posture data is associated with history information including measured date and measured time of the measurement data of the position-posture data or acquired date and acquired time of the measurement data of the position-posture data. Moreover, the second storage unit 429 may store the measurement data of the electric current data in a time-series manner as history data in which the measurement data of the electric current data is associated with history information including measured date and measured time of the measurement data of the electric current data or acquired date and acquired time of the measurement data of the electric current data.

For example, the measurement data may be data input by the user P through the inputter 310. The measurement data may be data input from the measurer 2 connected to the robot controller 400. The examples of the measurer 2 may include leveling equipment that measures the height of the transferrer 200, a current meter that measures the electric current value of the transferring motor 231, and the like. The measurement data may be data input from the external equipment 3, other than the measurer 2, which is connected to the robot controller 400. The external equipment 3 may be any equipment as long as the equipment can output data to the robot controller 400. The examples of the external equipment 3 may include: a general-purpose inputter, such as a numeric keypad; a computer; a smart device, such as a smartphone or a tablet; a storage medium, such as a flash memory; and memory equipment, such as a hard disk or a SSD. For example, the measurement data including many pieces of data may be input to from the measurer 2 and the external equipment 3 to the robot controller 400 collectively, or partly as needed.

The target data of the position-posture data is the position-posture data when the installation state of the transferrer 200 is normal. Moreover, the target data of the electric current data is the electric current data when the installation state of the transferrer 200 is normal. In other words, the target data of the position-posture data is the position-posture data by which the installation state of the transferrer 200 becomes normal, and the target data of the electric current data is the electric current data by which the installation state of the transferrer 200 becomes normal. The target data corresponds to the normal installation state of the transferrer 200. The target data of the position-posture data includes the target value and/or target range of the position-posture data, and the target data of the electric current data includes the target value and/or target range of the electric current data. For example, the target value and target range of the position-posture data may be the target values and target ranges of the position and posture of the transferrer 200. The target value and target range of the electric current data may be the target value and target range of the electric current value or the target value and target range of behavior of the electric current value that is a time-series change of the electric current value.

In the management mode, the management information processing unit 421 processes information input to the robot controller 400. The management information processing unit 421 operates the managing unit 420 in the management mode in accordance with the execution command of the management mode which is received from the inputter 310.

For example, when the management information processing unit 421 receives from the inputter 310, the measurer 2, the external equipment 3, or the like, a command that requests the input of the measurement data using this equipment, the management information processing unit 421 outputs this command to the first image outputting unit 424.

The management information processing unit 421 receives the input of the measurement data from the inputter 310, the measurer 2, the external equipment 3, or the like and outputs this measurement data to the converting unit 422.

When the management information processing unit 421 receives from the inputter 310 or the like, a command that requests the output of the installation state of the transferrer 200, the management information processing unit 421 outputs this command to the determining unit 423 and the second image outputting unit 425.

The management information processing unit 421 receives from the inputter 310 or the like, a command that requests the measurement of the electric current data. The management information processing unit 421 outputs the command to the manipulation information processing unit 411. The manipulation information processing unit 411 outputs to the second operation command unit 413 a command that executes an operation for measurement of the electric current data. Based on the information of the operation for measurement stored in the first storage unit 419, the second operation command unit 413 outputs to the transferring controlling unit 415 an autonomous operation command that causes the transferrer 200 to autonomously perform the operation for measurement. The transferring controlling unit 415 executes control that drives the transferring motor 231 in accordance with the autonomous operation command. For example, the operation for measurement may be an operation in which the transferring motor 231 drives for a predetermined period of time with predetermined output, such as maximum output. However, the present exemplary embodiment is not limited to this. The transferring controlling unit 415 outputs to the management information processing unit 421, time-series data of the electric current value which is acquired from the transferring motor 231. The management information processing unit 421 outputs this data to the converting unit 422.

When the first image outputting unit 424 receives from the management information processing unit 421 the command that requests the input of the measurement data, the first image outputting unit 424 reads image data stored in the second storage unit 429 and generates input image data of the measurement data. The first image outputting unit 424 outputs this image data through the regulating unit 426 to the corresponding equipment. When the above command is a command from the inputter 310, the first image outputting unit 424 transmits the input image data to the presenter 320 and causes the presenter 320 to display the input image data. When the above command is a command from the measurer 2, the first image outputting unit 424 may transmit the input image data to the measurer 2 and cause the measurer 2 to display the input image data. When the above command is a command from the external equipment 3, the first image outputting unit 424 may transmit the input image data to the external equipment 3 and cause the external equipment 3 to display the input image data.

Figure 8:
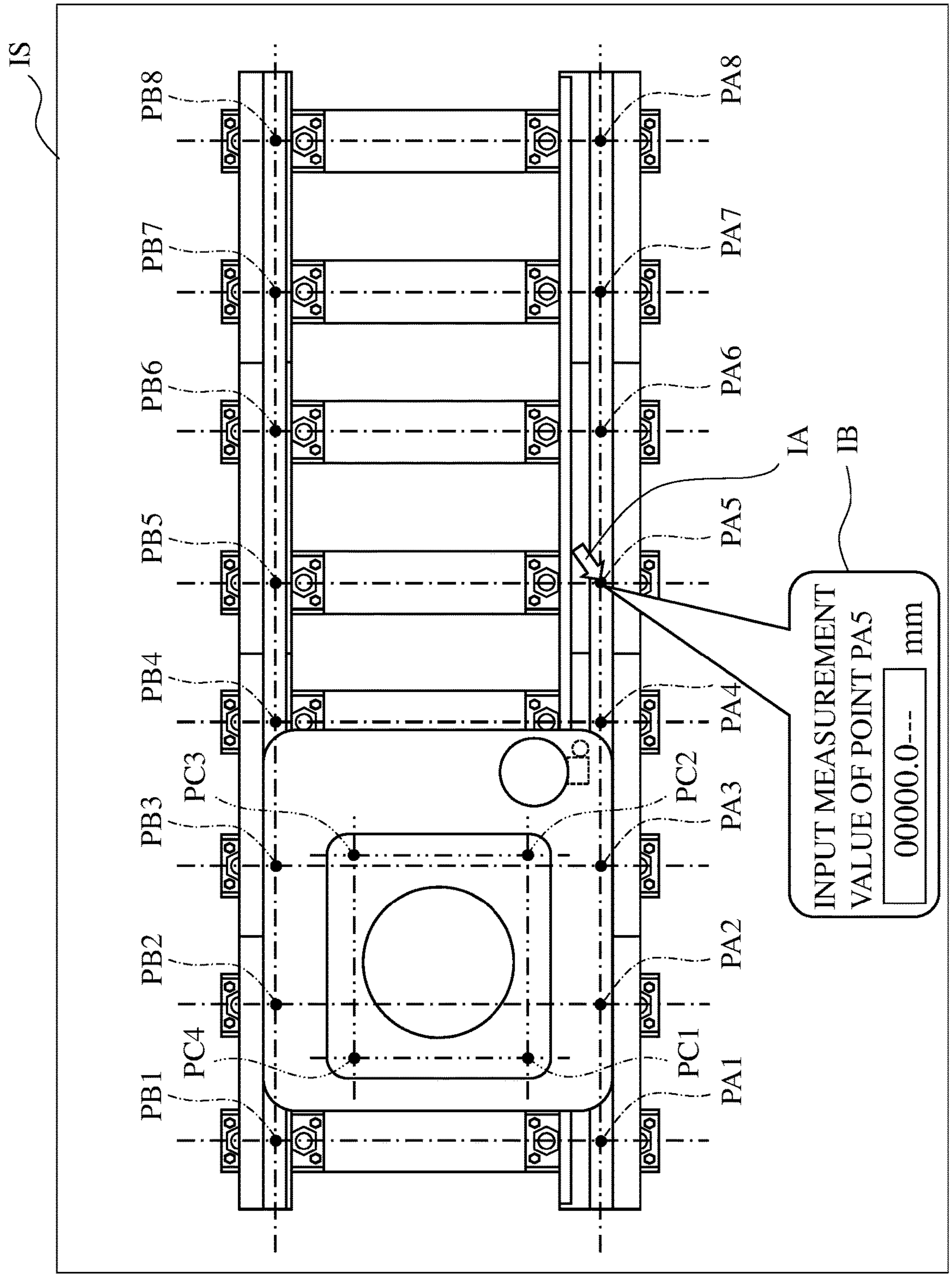
FIG. 8 is a diagram showing one example of an input screen image of measurement data which is output by the robot controller according to the exemplary embodiment.

For example, the first image outputting unit 424 may cause the presenter 320 to display a measurement data input screen image IS shown in FIG. 8. FIG. 8 is a diagram showing one example of the input screen image of the measurement data which is output by the robot controller 400 according to the exemplary embodiment. The input screen image IS is one example of a screen image for inputting height measurement data of the position-posture measurement data and includes an image of the transferrer 200 including the positions of the measurement points. For example, when the user P manipulates the inputter 310 to select any one of the measurement points PA1 to PA8, the measurement points PB1 to PB8, and the measurement points PC1 and PC4 on the input screen image IS with a pointer IA, a measurement value input box IB of the selected measurement point is displayed as a pop-up image. The user P can input the measurement value to the input box IB. The input measurement value is transmitted to the management information processing unit 421. The measurement data input screen image is not limited to the input screen image of the height measurement data. The measurement data input screen image may be a screen image to which the measurement data of the inclination amount, the measurement data of the electric current value, or both the measurement data of the inclination amount and the measurement data of the electric current value can be input instead of or in addition to the measurement data of the height.

The regulating unit 426 regulates the range of the measurement data acceptable through the measurement data input screen image, in accordance with the type of the measurement data. Information of the range of the measurement data which corresponds to the type of the measurement data may be stored in the second storage unit 429, and the regulating unit 426 may use the information of the range which is stored in the second storage unit 429. For example, as the above range, the regulating unit 426 regulates the unit of the measurement data and the number of digits of the measurement data inputtable by this unit. For example, the regulating unit 426 regulates the number of digits after the decimal point, such as the number of digits to the first decimal place or the number of digits to the second decimal place, to a predetermined number of digits as the number of digits of the measurement data. The regulating unit 426 transmits to the corresponding equipment, such as the presenter 320, image data obtained by reflecting a regulation result on the input image data received from the first image outputting unit 424. Moreover, the regulating unit 426 transmits the regulation result to equipment, such as the inputter 310, to which the measurement data is input. With this, the range of the inputtable measurement data is regulated in both the measurement data input screen image and the equipment to which the measurement data is input. For example, in the input screen image IS of FIG. 6, the regulating unit 426 regulates the unit of the height to “mm” and also regulates the number of digits after the decimal point, which is inputtable by the unit “mm”, to “1”.

The converting unit 422 converts a format of the measurement data received by the management information processing unit 421 from the inputter 310, the measurer 2, the external equipment 3, or the like, into a format corresponding to processing performed by the managing unit 420 and outputs the format. Specifically, the converting unit 422 converts the format of the measurement data into a format corresponding to processing performed by the determining unit 423. The converting unit 422 outputs the converted data to the determining unit 423, stores the converted data in the second storage unit 429, or outputs the converted data to the determining unit 423 and stores the converted data in the second storage unit 429. The converting unit 422 may associate the converted data with history information of this data and store the obtained data in the second storage unit 429.

For example, the format of the measurement data transmitted from the inputter 310, the measurer 2, the external equipment 3, or the like may be a format of text data, such as a numerical value, or a specific format set in each equipment. The converting unit 422 converts the measurement data of such format into the data of a format that can be processed by the determining unit 423. With this, the robot controller 400 can accept the input of the measurement data from various equipment and process the input. The converting unit 422 may convert the format of the electric current measurement data received by the management information processing unit 421 from the transferring controlling unit 415.

The determining unit 423 compares the converted measurement data received from the converting unit 422 with the target data stored in the second storage unit 429, to determine the presence or absence of the abnormality of the installation state of the transferrer 200. The determining unit 423 outputs the determination result to the second image outputting unit 425, outputs the determination result to and stores the determination result in the second storage unit 429, or outputs the determination result to the second image outputting unit 425 and stores the determination result in the second storage unit 429. The determining unit 423 may associate the determination result with history information of the measurement data and store the obtained data in the second storage unit 429.

For example, when at least one of following two cases occurs, the determining unit 423 may determine that the installation state is abnormal. One of the two cases is a first case in which the converted position-posture measurement data does not satisfy the target data of the position-posture data, and another of the two cases is a second case in which the converted electric current measurement data does not satisfy the target data of the electric current data.

In the present exemplary embodiment, when the first case and the second case do not occur, the determining unit 423 determines that the installation state is normal. Other than this, the determining unit 423 determines that the installation state is abnormal. However, the present exemplary embodiment is not limited to this. For example, when there is a measurement error or input error of the measurement data, the first case may not occur even if the installation state is abnormal. However, since the electric current measurement data does not satisfy the target data, the second case may occur. When the transferring motor 231 itself is abnormal, the second case may not occur even if the installation state is abnormal. However, since the position-posture measurement data does not satisfy the target data, the first case may occur. Therefore, the accuracy of the determination that the installation state is normal improves.

The determining unit 423 may determine the presence or absence of the abnormality of the installation state by using only one of the position-posture measurement data and the electric current measurement data. In this case, when the position-posture measurement data satisfies the target data or when the electric current measurement data satisfies the target data, the determining unit 423 may determine that the installation state is normal.

That the position-posture measurement data satisfies the target data may denote that the position, posture, or the like of the position-posture measurement data coincides with the target value, is the target value or more, or is the target value or less. That the position-posture measurement data satisfies the target data may denote that the position, posture, or the like of the position-posture measurement data falls within the target range.

That the electric current measurement data satisfies the target data may denote that the electric current value satisfies the target data. For example, that the electric current value satisfies the target data may denote that a specific value, such as a maximum value or minimum value of the electric current value, satisfies the target data. For example, that the electric current value satisfies the target data may denote that the specific value coincides with the target value, is the target value or more, or is the target value or less. For example, that the electric current value satisfies the target data may denote that the electric current value, the specific value of the electric current value, or each of the electric current value and the specific value falls within a target allowable range, i.e., the target range.

For example, that the electric current measurement data satisfies the target data may denote that the behavior of the electric current value satisfies the target data. For example, that the behavior of the electric current value satisfies the target data may denote that the behavior of the electric current value coincides with target behavior of the electric current value, that the behavior of the electric current value falls within a target allowable range of the behavior of the electric current value, or that a difference between the behavior of the electric current value and the target behavior of the electric current value falls within a predetermined allowable range. For example, that the behavior of the electric current value satisfies the target data may denote that the waveform of the electric current value with time coincides with a target waveform of the electric current value, that the waveform of the electric current value with time falls within a target allowable range of a waveform change of the electric current value, or that a difference between the waveform of the electric current value with time and the target waveform of the electric current value falls within a predetermined allowable range.

When the second image outputting unit 425 receives from the management information processing unit 421 a command that requests the output of the installation state of the transferrer 200, the second image outputting unit 425 reads the image data stored in the second storage unit 429 and generates output image data of the installation state. The second image outputting unit 425 outputs this image data to the corresponding equipment. When the above command is a command from the inputter 310, the second image outputting unit 425 transmits the output image data to the presenter 320 and causes the presenter 320 to display the output image data. When the above command is a command from the measurer 2 or the external equipment 3, the second image outputting unit 425 may transmit the output image data to the measurer 2 or the external equipment 3 and cause the measurer 2 or the external equipment 3 to display the output image data.

When the above command requests the output of the installation state based on the input measurement data, the second image outputting unit 425 outputs the output image data on which the determination result of the determining unit 423 is reflected. For example, the second image outputting unit 425 may cause the presenter 320 to display an installation state output screen image OSA shown in FIG. 9. FIG. 9 is a diagram showing one example of the output screen image of the installation state of the transferrer 200 which is output by the robot controller 400 according to the exemplary embodiment. The output screen image OSA includes: an image of the transferrer 200 including the positions of the measurement points; determination results of the presence or absence of the abnormality regarding the measurement values of the measurement points and the electric current value; and a determination result of the presence or absence of the abnormality of the installation state. For example, "OK" means that there is no abnormality, and "NG" means that there is an abnormality. Since the determination results of the presence or absence of the abnormality regarding the measurement values of the measurement points and the electric current value are displayed, the user P can accurately specify the cause of the abnormality and deal with it. Instead of or in addition to the determination results of the presence or absence of the abnormality, the measurement values may be displayed on the output screen image OSA.

The determination results of the presence or absence of the abnormality regarding the electric current values may be output and displayed in accordance with the position of the movable stage 210. For example, the position of the movable stage 210 may be detected based on the rotation amount of the transferring motor 231, and the determination result of the presence or absence of the abnormality regarding the electric current value at a timing when the movable stage 210 passes through a predetermined measurement point among the measurement points PA1 to PA8 may be output.

When the above command requests the output of the history data of the installation state which is stored in the second storage unit 429, the second image outputting unit 425 outputs the output image data on which the history data is reflected. For example, the second image outputting unit 425 may cause the presenter 320 to display an installation state history output screen image OSB shown in FIG. 10. FIG. 10 is a diagram showing one example of the output screen image of the history of the installation state of the transferrer 200 which is output by the robot controller 400 of the exemplary embodiment. The output screen image OSB includes: the image of the transferrer 200 including the positions of the measurement points; the measurement dates of the measurement data; the determination results of the presence or absence of the abnormality regarding the measurement points and the electric current value; and the determination result of the presence or absence of the abnormality of the installation state. Since the histories of the determination results of the presence or absence of the abnormality regarding the measurement points and the electric current value are displayed, the user P can accurately specify the cause of the abnormality and the behavior and can deal with them. Instead of or in addition to the determination results of the presence or absence of the abnormality, the measurement values may be displayed on the output screen image OSB. The determination results of the presence or absence of the abnormality regarding the electric current value may be displayed in accordance with the position of the movable stage 210.

Operation of Robot System

Figure 11:
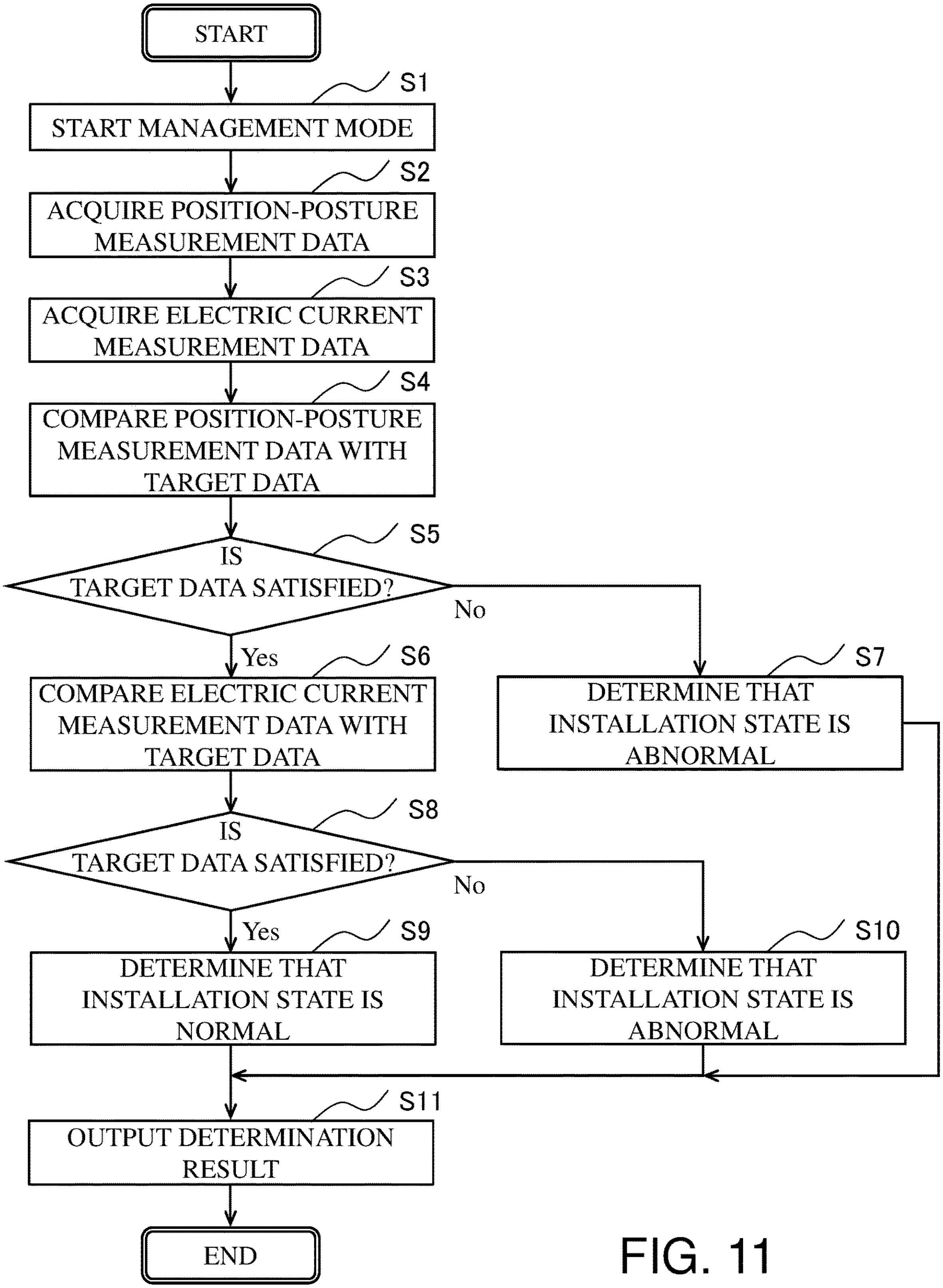
FIG. 11 is a flowchart showing one example of abnormality determination processing of the robot controller according to the exemplary embodiment.

The operation of the robot system 1 according to the exemplary embodiment in the management mode will be described. Specifically, the following will describe processing in which: the robot controller 400 receives the measurement data through the manipulation inputter 300; and the robot controller 400 determines the presence or absence of the abnormality of the installation state of the transferrer 200 based on this measurement data. FIG. 11 is a flowchart showing one example of abnormality determination processing of the robot controller 400 according to the exemplary embodiment.

As shown in FIG. 11, in Step S1, the user P inputs to the inputter 310 of the manipulation inputter 300 a command that executes the management mode and a command that executes the determination of the installation state of the transferrer 200 by using the input measurement data. When the robot controller 400 receives the above commands from the manipulation inputter 300, the robot controller 400 starts the control in the management mode.

Next, in Step S2, the robot controller 400 transmits to the manipulation inputter 300 the image data that requests the input of the position-posture measurement data, and the presenter 320 of the manipulation inputter 300 displays this image data as a screen image. For example, the presenter 320 displays the input screen image IS shown in FIG. 8. The user P inputs the measurement value of each measurement point on the input screen image IS by using the inputter 310. The robot controller 400 receives the data of the measurement value of the measurement point which is transmitted from the manipulation inputter 300, i.e., receives the position-posture measurement data.

Next, in Step S3, the robot controller 400 transmits to the manipulation inputter 300 the image data that requests the input of the electric current measurement data, and the presenter 320 displays this image data as a screen image. The user P inputs to the inputter 310 a command that executes the measurement of the electric current data. When the robot controller 400 receives this command, the robot controller 400 causes the transferrer 200 to autonomously execute the operation for measurement of the electric current data. The robot controller 400 acquires the data of the electric current value of the transferring motor 231 of the transferrer 200 which is performing the operation for measurement, i.e., acquires the electric current measurement data.

Next, in Step S4, the robot controller 400 compares the position-posture measurement data acquired in Step S2 with the target data of the position-posture data which is stored in the second storage unit 429.

Next, in Step S5, when the position-posture measurement data satisfies the target data (Yes in Step S5), the robot controller 400 proceeds to Step S6. When the position-posture measurement data does not satisfy the target data, (No in Step S5), the robot controller 400 proceeds to Step S7.

In Step S7, the robot controller 400 determines that the installation state of the transferrer 200 is abnormal. Then, the robot controller 400 proceeds to Step S11.

In Step S6, the robot controller 400 compares the electric current measurement data acquired in Step S3 with the target data of the electric current data which is stored in the second storage unit 429.

Next, in Step S8, when the electric current measurement data satisfies the target data (Yes in Step S8), the robot controller 400 proceeds to Step S9. When the electric current measurement data does not satisfy the target data (No in Step S8), the robot controller 400 proceeds to Step S10.

In Step S9, the robot controller 400 determines that the installation state of the transferrer 200 is normal. Then, the robot controller 400 proceeds to Step S11.

In Step S10, the robot controller 400 determines that the installation state of the transferrer 200 is abnormal. Then, the robot controller 400 proceeds to Step S11.

In Step S11, the robot controller 400 transmits to the manipulation inputter 300 the image data showing the determination result, and the presenter 320 displays this image data as a screen image. For example, the presenter 320 displays the output screen image OSA shown in FIG. 9.

Through Steps S1 to S11, the user P inputs the measurement data to the robot controller 400 of the robot 100 by using the manipulation inputter 300 of the robot 100, and the robot controller 400 can detect the presence or absence of the abnormality of the installation state of the transferrer 200 by using the input measurement data.

When the measurer 2 or the external equipment 3 is used for the input of the measurement data, the robot controller 400 may execute the image display processing and the position-posture measurement data acquiring processing, which are performed in Step S2, with respect to the measurer 2 or the external equipment 3. The robot controller 400 may execute the image display processing and the electric current measurement data acquiring processing, which are performed in Step S3, with respect to the measurer 2 or the external equipment 3. The robot controller 400 may execute the image display processing, which is performed in Step S11, with respect to the measurer 2 or the external equipment 3.

The robot controller 400 may compare the measurement data and the target data, which are stored in the second storage unit 429, to determine the presence or absence of the abnormality of the installation state of the transferrer 200 which corresponds to the measurement data.

Other Embodiments

The foregoing has described the exemplary embodiment of the present disclosure. However, the present disclosure is not limited to the above exemplary embodiment. To be specific, various modifications and improvements may be made within the scope of the present disclosure. For example, embodiments prepared by variously modifying the exemplary embodiment and embodiments prepared by combining components in different exemplary embodiments are within the scope of the present disclosure.

For example, in the exemplary embodiment, the robot controller 400 determines the presence or absence of the abnormality of the installation state of the transferrer 200 by using the position-posture measurement data of the transferrer 200 and the electric current measurement data of the transferring motor 231. However, the exemplary embodiment is not limited to this.

For example, the robot controller 400 may determine the presence or absence of the abnormality of the installation state of the transferrer 200 by comparing the measurement data of vibration data of the transferrer 200 with the target data of the vibration data of the transferrer 200. The measurement data of the vibration data is vibration measurement data including a measurement result of vibration generated by the transferrer 200.

For example, the robot controller 400 may determine the presence or absence of the abnormality of the installation state of the transferrer 200 by comparing the measurement data of sound data of the transferrer 200 with the target data of the sound data of the transferrer 200. The measurement data of the sound data is sound measurement data including a measurement result of noise generated by the transferrer 200.

Figure 12:
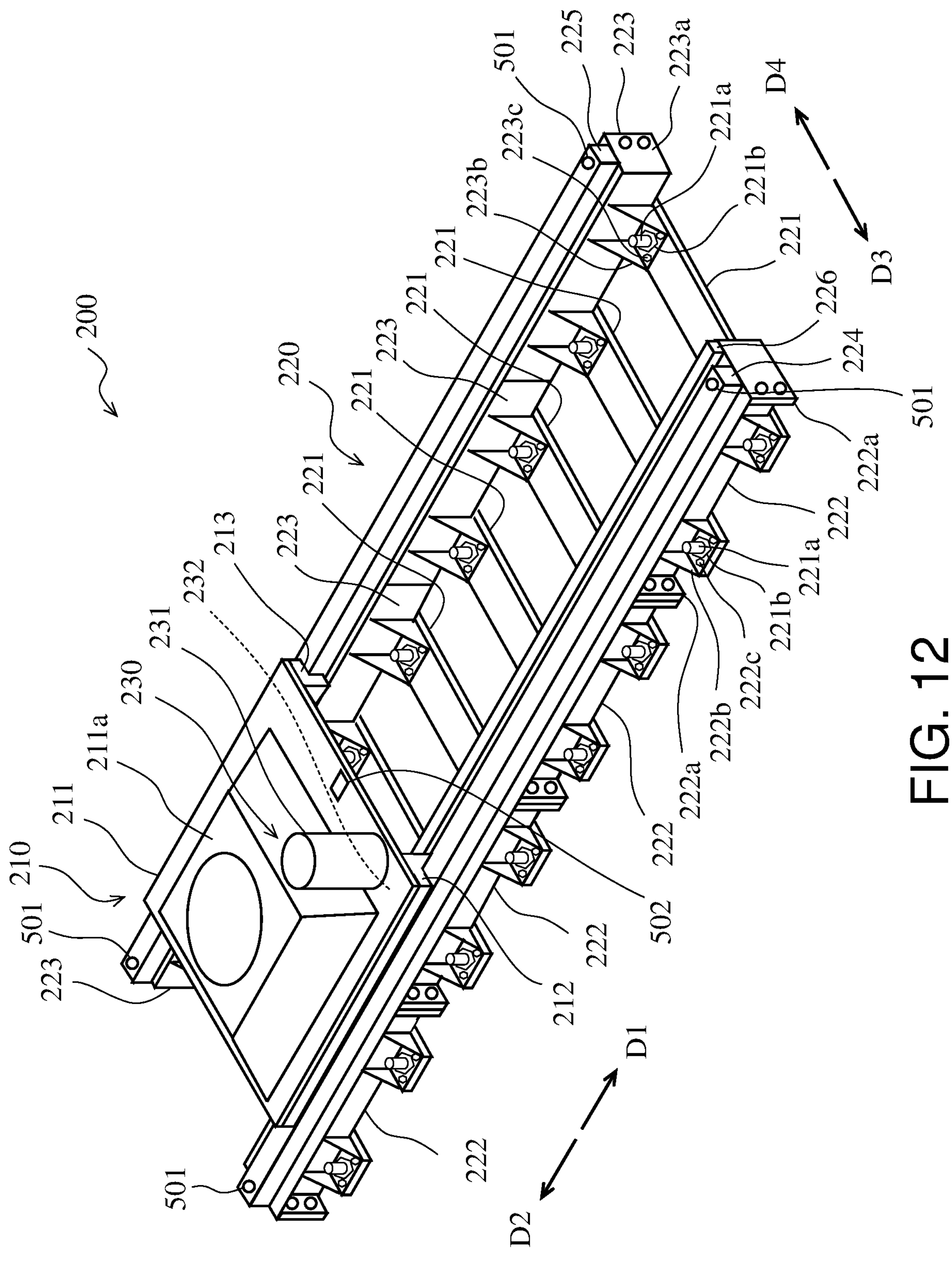
FIG. 12 is a perspective view showing one example of the configuration of a transferrer according to the exemplary embodiment, which measures vibration and sound of the transferrer.

The vibration generated by the transferrer 200 may be detected by vibration detectors 501 shown in FIG. 12, and the noise generated by the transferrer 200 may be detected by a sound detector 502 shown in FIG. 12. Each of the vibration detectors 501 and the sound detector 502 may output a detection signal to the robot controller 400. FIG. 12 is a perspective view showing one example of the configuration of a transferrer 200 according to the exemplary embodiment, which measures vibration and sound of the transferrer 200.

As shown in FIG. 12, the vibration detectors 501 may be located at both ends of the first guide member 224 in the direction D1 and both ends of the second guide member 225 in the direction D1. The vibration detectors 501 may be further located at a position between both ends of the first guide member 224 in the direction D1 and a position between both ends of the second guide member 225 in the direction D1. Examples of the vibration detectors 501 include acceleration sensors and strain sensors. When the vibration detector 501 is the acceleration sensor, the vibration detector 501 may detect, as the vibration measurement data, an acceleration in at least one of an axial direction along the direction D1, an axial direction along the direction D3, or an axial direction perpendicular to the directions D1 and D3. The target data of the vibration data may include the target value and/or target range of the acceleration and the target value and target range of behavior of the acceleration that is a time-series change of the acceleration.

The sound detector 502 may be located at the movable stage 210. A plurality of the sound detectors 502 may be located in the vicinity of the sliding member 212 and in the vicinity of the sliding member 213. Examples of the sound detector 502 include a noise meter and a microphone. The sound detector 502 may detect at least sound intensity out of the sound intensity and a sound direction, as the sound measurement data. The target data of the sound data may include the target value and/or target range of the sound intensity and the target value and target range of behavior of the sound intensity that is a time-series change of the sound intensity.

The robot controller 400 may determine the presence or absence of the abnormality of the installation state of the transferrer 200 by using at least one selected from the group including the position-posture measurement data, the electric current measurement data, the vibration measurement data, and the sound measurement data. The robot controller 400 may receive at least one of four pieces of measurement data including the position-posture measurement data, the electric current measurement data, the vibration measurement data, and the sound measurement data. When at least one of the at least one received measurement data does not satisfy the target data, the robot controller 400 may determine that the installation state is abnormal. When all the at least one received measurement data satisfy the target data, the robot controller 400 may determine that the installation state is normal.

In the exemplary embodiment, the robot controller 400 uses, as the position-posture data of the transferrer 200, position data that is height data of the transferrer 200 and posture data that is inclination data of the transferrer 200 in a height direction. However, the position-posture data is not limited to these. The position data included in the position-posture data may include data of the position of any portion of the transferrer 200, and this position may include a position in any direction in a three-dimensional space. This position may be an absolute position of a target portion itself of the transferrer 200 or may be a relative position of the target portion relative to another portion of the transferrer 200. The posture data may include data of the posture of any portion of the transferrer 200, and this posture may include an orientation with respect to any direction, such as a posture angle with respect to any direction in a three-dimensional space. This posture may be an absolute posture of the target portion itself of the transferrer 200 or may be a relative posture of the target portion relative to another portion of the transferrer 200.

In the exemplary embodiment, the robot controller 400 controls the operation of the transferrer 200. However, the operation of the transferrer 200 may be controlled by a controller other than the robot controller 400. In this case, the robot controller 400 may output to this controller a command that causes the transferrer 200 to execute an operation for measuring the electric current data.

In the exemplary embodiment, a transferrer that is a target of the determination performed by the robot controller 400 regarding the presence or absence of the abnormality of the installation state is the transferrer 200 that can support and move the robot 100. However, the exemplary embodiment is not limited to this. The transferrer as the target of the robot controller 400 may be any transferrer associated with the robot 100. For example, the transferrer may be a transferrer that can support and move a target object handled by the robot 100 or may be a transferrer that can support and move the target object and the robot 100. Such transferrer is located for the robot 100 and is associated with the robot 100.

Figure 13:
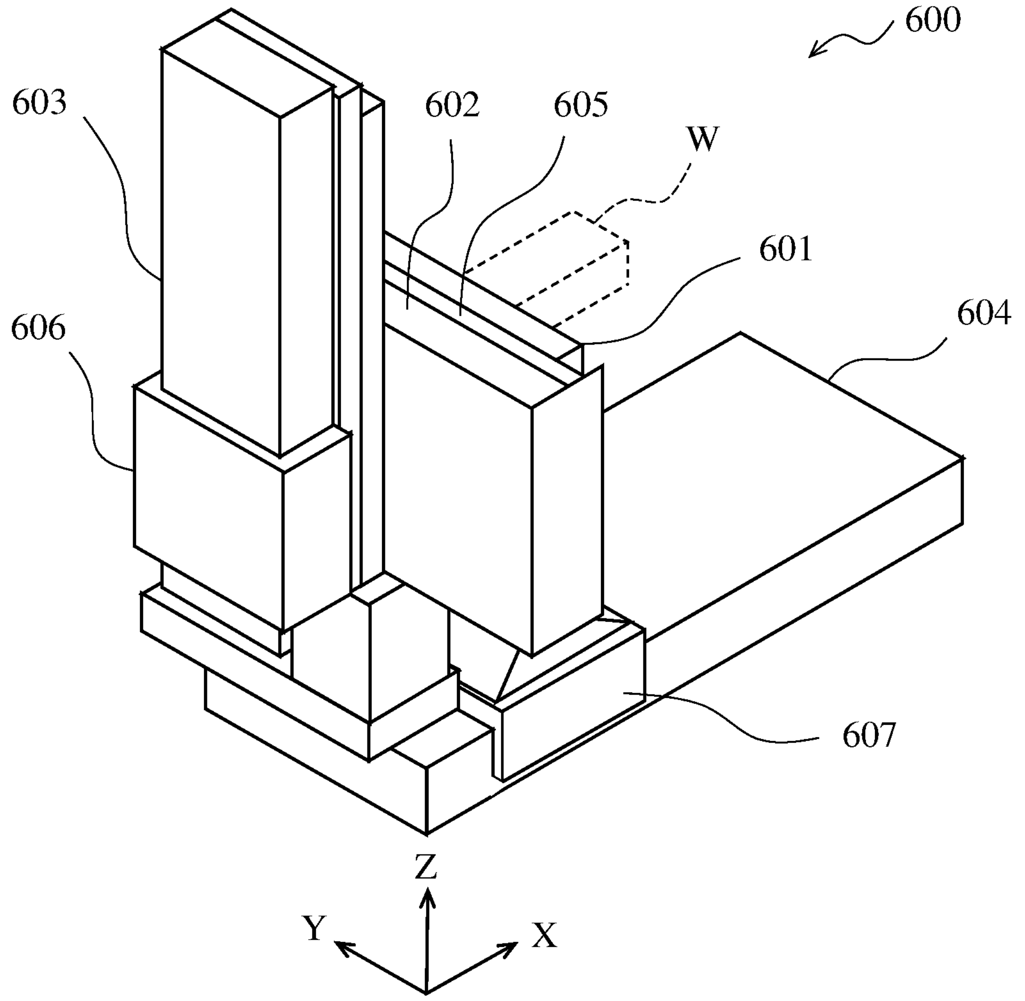
FIG. 13 is a perspective view showing a modified example of the transferrer according to the exemplary embodiment.

For example, the transferrer may be a NC (Numerical Control) locator 600 shown in FIG. 13. FIG. 13 is a perspective view showing a modified example of the transferrer according to the exemplary embodiment. As shown in FIG. 13, the NC locator 600 can hold a target object W handled by the robot 100 and move the target object W in three axial directions that are directions along an X-axis, a Y-axis, and a Z-axis orthogonal to each other. For example, the target object W may be a workpiece that is a work target of the robot 100 or may be a tool, equipment, or the like which applies action to a workpiece. For example, when the NC locator 600 is used in an automobile manufacturing line, the workpiece may be an automobile body, and the tool or equipment may be a tool or equipment which holds an automobile part.

The NC locator 600 is operated by computer control and is controlled to change the position of the target object W in association with the operation of the robot 100. The robot controller 400 may control the operation of the NC locator 600 together with the robot 100 or may output operation information indicating the operation of the robot 100 to another controller that controls the operation of the NC locator 600.

The NC locator 600 includes a holder 601 that holds the target object W. When the NC locator 600 is located on a horizontal supporting surface, the NC locator 600 can move the holder 601 in an X-axis direction, a Y-axis direction, and a Z-axis direction. The X-axis direction and the Y-axis direction are horizontal directions, and the Z-axis direction is a vertical direction. The NC locator 600 includes: a first mover 605 that slides the holder 601 relative to a first support 602 in the Y-axis direction; a second mover 606 that slides the first support 602 relative to a second support 603 in the Z-axis direction; and a second mover 607 that slides the second support 603 relative to a third support 604 in the X-axis direction. The third support 604 is located on the supporting surface.

The position-posture management of the NC locator 600 may include the posture management of the holder 601, the posture management of the first support 602, and the position management and posture management of the supports 603 and 604.

The posture management of the holder 601 may include the inclination management of, for example, the upper surface of the holder 601. The posture management of the first support 602 may include the inclination management of, for example, the upper surface of the first support 602. The position management of the second support 603 may include the height management of the upper surface of the second support 603, and the posture management of the second support 603 may include the inclination management of, for example, the upper surface and side surface of the second support 603. The position management of the third support 604 may include the height management of the upper surface of the third support 604, and the posture management of the third support 604 may include the inclination management of, for example, the upper surface of the third support 604.

Each of the movers 605 to 607 includes a servomotor as an electric motor that moves the holder 601, the support 602, or the support 603. The robot controller 400 may use the electric current values of the servomotors to determine the presence or absence of the abnormality of the installation state of the NC locator 600.

For example, at least one of the supports 602 to 604 of the NC locator 600 may include a vibration detector. The robot controller 400 may use a detection result of the vibration detector as a management target of the installation state of the NC locator 600.

For example, at least one of the movers 605 to 607 of the NC locator 600 may include a sound detector. The robot controller 400 may use a detection result of the sound detector as a management target of the installation state of the NC locator 600.

The robot controller 400 may compare the target data of the management target with the measurement data of the management target to determine the presence or absence of the abnormality of the installation state of the NC locator 600.

Examples of aspects of the technique of the present disclosure are as below. A robot controller according to one aspect of the present disclosure is a robot controller that controls an operation of a robot. The robot controller includes: circuitry; and memory equipment. The memory equipment stores target data indicating a target installation state of a transferrer that supports and moves at least one of the robot or a target object handled by the robot. The circuitry outputs to a display an input image that shows a measurement position of an installation state of the transferrer together with an image of the transferrer. The circuitry receives measurement data of the installation state. The circuitry compares the measurement data with the target data to determine the presence or absence of an abnormality of the installation state. The memory equipment may be included in the circuitry or may be located separately from the circuitry.

According to the above aspect, the transferrer is a transferrer related to the robot. The robot controller can present the input image that shows the measurement position of the installation state of the transferrer together with the image of the transferrer. The robot controller can receive the measurement data of the installation state. The robot controller can determine the presence or absence of the abnormality of the measurement data by using the target data stored in the memory equipment. To be specific, the robot controller can detect installation failure of the transferrer. The robot controller is located so as to correspond to the robot that is a control target. Therefore, when confirming the installation state of the transferrer related to the robot, the user may use the robot controller for this robot. For example, the user does not have to select a piece of data of the transferrer that is a confirmation target, from pieces of data of plural transferrers related to plural robots. Therefore, the installation state of the transferrer that is the confirmation target can be surely and easily confirmed.

In the robot controller according to the aspect of the present disclosure, the circuitry may store in the memory equipment the measurement data as history data in which a history of the received measurement data is associated with the measurement data.

According to the above aspect, the memory equipment stores the history data of the measurement data. With this, the robot controller can detect the presence or absence of the abnormality of the installation state of the transferrer by using the history data. The user can estimate the cause of the abnormality by confirming the detection result and the history data. Thus, the user can quickly take measures to eliminate the abnormality.

In the robot controller according to the aspect of the present disclosure, the circuitry may receive as the measurement data at least one data selected from the group including: position-posture measurement data including at least one of a measurement result of a position of the transferrer or a measurement result of a posture of the transferrer; electric current measurement data including a measurement result of an electric current of a motor that drives the transferrer; vibration measurement data including a measurement result of vibration generated by the transferrer; and sound measurement data including a measurement result of noise generated by the transferrer. When at least one of the at least one measurement data does not satisfy the target data, the circuitry may determine that the installation state is abnormal.

According to the above aspect, when the position-posture measurement data does not satisfy the target data, the position or posture of the transferrer is abnormal, and this abnormality may be caused by the abnormality of the installation state of the transferrer. The robot controller can detect the presence or absence of the abnormality of the installation state of the transferrer by detecting the presence or absence of the abnormality of the position-posture measurement data. The abnormalities of the position and posture of the transferrer may generate excessive load at a portion of the transferrer which moves the robot, the target object, or both the robot and the target object.

When the electric current measurement data does not satisfy the target data, excessive load may be generated in the motor. The excessive load may be caused by the abnormality of the installation state of the transferrer. The robot controller can detect the presence or absence of the abnormality of the installation state of the transferrer by detecting the presence or absence of the abnormality of the electric current measurement data.

When the vibration measurement data does not satisfy the target data, abnormal vibration may be generated at a portion of the transferrer which moves the robot, the target object, or both the robot and the target object. The abnormal vibration may be caused by the abnormality of the installation state of the transferrer. The robot controller can detect the presence or absence of the abnormality of the installation state of the transferrer by detecting the presence or absence of the abnormality of the vibration measurement data.

When the sound measurement data does not satisfy the target data, abnormal noise may be generated at a portion of the transferrer which moves the robot, the target object, or both the robot and the target object. The abnormal noise may be caused by the abnormality of the installation state of the transferrer. The robot controller can detect the presence or absence of the abnormality of the installation state of the transferrer by detecting the presence or absence of the abnormality of the sound measurement data.

On the other hand, even when the installation state of the transferrer is abnormal, the following cases may occur. Examples of such cases include: a case where the position-posture measurement data including a wrong measurement result is received, and therefore, the position-posture measurement data satisfies the target data; a case where the motor itself is abnormal, and therefore, the electric current measurement data satisfies the target data; a case where a detector, such as a sensor, which detects vibration is abnormal, and therefore, the vibration measurement data satisfies the target data; and a case where a detector, such as a sensor, which detects sound is abnormal, and therefore, the sound measurement data satisfies the target data. Only when all of the received measurement data among the position-posture measurement data, the electric current measurement data, the vibration measurement data, and the sound measurement data satisfy the target data, the robot controller determines that the installation state of the transferrer is normal. Therefore, the accuracy of the determination of the normality of the installation state can be improved.

In the robot controller according to the aspect of the present disclosure, the circuitry may output to the display the input image that shows, together with the image of the transferrer, the measurement position where the measurement data is allowed to be accepted. The memory equipment may store information of the measurement position and information of the image of the transferrer.

According to the above aspect, the robot controller presents to the user the image including the transferrer and the measurement position and receives the input of the measurement data from the user. Therefore, the user can easily and surely input the measurement data.

In the robot controller according to the aspect of the present disclosure, the circuitry may regulate a range of the measurement data, which is allowed to be accepted through the input image, in accordance with a type of the measurement data. The memory equipment may store information of the range of the measurement data.

According to the above aspect, the robot controller regulates the inputtable range in accordance with the type of the measurement data. Therefore, the user can easily input the measurement data.

In the robot controller according to the aspect of the present disclosure, the circuitry may output to the display an output image that shows the measurement position and at least one of the measurement data or a determination result of the presence or absence of the abnormality of the installation state, together with the image of the transferrer. The memory equipment may store information of the measurement position and information of the image of the transferrer.

According to the above aspect, the robot controller presents to the user the measurement data, the determination result of the presence or absence of the abnormality, or both the measurement data and the determination result, together with the image of the transferrer. Therefore, the user can easily and visually recognize the measurement data, the presence or absence of the abnormality, or both the measurement data and the presence or absence of the abnormality.

In the robot controller according to the aspect of the present disclosure, the circuitry may convert a format of the measurement data received by the circuitry into a format corresponding to processing of the determination of the presence or absence of the abnormality of the installation state.

According to the above aspect, the robot controller can accept the measurement data of various formats and detect the presence or absence of the abnormality of the installation state of the transferrer by using the measurement data. For example, the robot controller can collectively receive the measurement data including various data and use the measurement data in the determination processing regarding the presence or absence of the abnormality.

In the robot controller according to the aspect of the present disclosure, the format of the measurement data received by the circuitry may include at least one of a format set to a measurer that measures the installation state or a format of text data.

According to the above aspect, the robot controller can collectively receive the measurement data including various data from the measurer by, for example, being connected to the measurer and can detect the presence or absence of the abnormality of the installation state of the transferrer by using the measurement data. The robot controller can collectively receive the text data of the measurement data including various data and detect the presence or absence of the abnormality of the installation state of the transferrer by using the text data. Therefore, processing of inputting the measurement data to the robot controller is facilitated.

A robot system according to one aspect of the present disclosure includes: the robot controller according to the aspect of the present disclosure; the robot controlled by the robot controller; and the transferrer.

According to the above aspect, the same effects as the robot controller according to the aspect of the present disclosure are obtained.

In the robot system according to the aspect of the present disclosure, the robot controller may control the operation of the transferrer.

According to the above aspect, when the robot controller performs feedback control of the transferrer, the robot controller may use the rotation amount and electric current value of the motor of the transferrer. The robot controller can determine the presence or absence of the abnormality of the installation state by utilizing information acquired in a process of controlling the transferrer. To be specific, new equipment is unnecessary to determine the presence or absence of the abnormality of the installation state.

The numerals such as ordinal numbers and quantities as used herein are all given to describe the technology of the present disclosure in concrete terms and not intended to limit the present disclosure. The connection relationships between the elements are used to describe the technology of the present disclosure in concrete terms, and any connection relationships may be employed to achieve the functionality taught in the present disclosure.

The scope of the present disclosure is defined by the appended claims rather than by the foregoing description so that the present disclosure may be embodied in various forms without departing from the essential characteristics of the present disclosure. The embodiments and modifications are meant to be illustrative only and not limiting as to the scope of the present disclosure. All changes which come within the meaning and range of equivalency of the claims are to be embraced within the scope of the claims.

The invention claimed is:

1. A robot controller that controls an operation of a robot, the robot controller comprising:

circuitry; and memory equipment, wherein:

the memory equipment stores target data indicating a target installation state of a transferrer that supports and moves at least one of the robot or a target object handled by the robot;

the circuitry outputs to a display an input image that shows a measurement position of an installation state of the transferrer together with an image of the transferrer;

the circuitry receives measurement data of the installation state; and the circuitry compares the measurement data with the target data to determine the presence or absence of an abnormality of the installation state, and wherein:

the circuitry outputs to the display the input image that shows, together with the image of the transferrer, the measurement position where the measurement data is allowed to be accepted and a measurement value input box of the measurement position; and the memory equipment stores information of the measurement position and information of the image of the transferrer.

2. The robot controller according to claim 1, wherein the circuitry stores in the memory equipment the measurement data as history data in which a history of the received measurement data is associated with the measurement data.

3. The robot controller according to claim 1, wherein:

the circuitry receives as the measurement data at least one data selected from the group including:

position-posture measurement data including at least one of a measurement result of a position of the transferrer or a measurement result of a posture of the transferrer;

electric current measurement data including a measurement result of an electric current of a motor that drives the transferrer;

vibration measurement data including a measurement result of vibration generated by the transferrer; and sound measurement data including a measurement result of noise generated by the transferrer, and when at least one of the at least one measurement data does not satisfy the target data, the circuitry determines that the installation state is abnormal.

4. The robot controller according to claim 1, wherein:

the circuitry regulates a range of the measurement data, which is allowed to be accepted through the input image, in accordance with a type of the measurement data; and the memory equipment stores information of the range of the measurement data.

5. The robot controller according to claim 1, wherein:

the circuitry outputs to the display an output image that shows the measurement position and at least one of the measurement data or a determination result of the presence or absence of the abnormality of the installation state, together with the image of the transferrer.

6. The robot controller according to claim 1, wherein the circuitry converts a format of the measurement data received by the circuitry into a format corresponding to processing of the determination of the presence or absence of the abnormality of the installation state.

7. The robot controller according to claim 6, wherein the format of the measurement data received by the circuitry includes at least one of a format set to a measurer that measures the installation state or a format of text data.

8. A robot system comprising:

the robot controller according to claim 1;

the robot controlled by the robot controller; and the transferrer.

9. The robot system according to claim 8, wherein the robot controller controls the operation of the transferrer.

* * * * *